(12) United States Patent
Sengoku

(10) Patent No.: US 9,996,488 B2
(45) Date of Patent: Jun. 12, 2018

(54) I3C HIGH DATA RATE (HDR) ALWAYS-ON IMAGE SENSOR 8-BIT OPERATION INDICATOR AND BUFFER OVER THRESHOLD INDICATOR

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 15/246,098

(22) Filed: Aug. 24, 2016

(65) Prior Publication Data

US 2016/0364353 A1 Dec. 15, 2016

Related U.S. Application Data

(63) Continuation-in-part of application No. 14/480,540, filed on Sep. 8, 2014, now Pat. No. 9,519,603, which
(Continued)

(51) Int. Cl.
*G06F 13/00* (2006.01)
*G06F 13/364* (2006.01)
(Continued)

(52) U.S. Cl.
CPC ........ *G06F 13/364* (2013.01); *G06F 13/1673* (2013.01); *G06F 13/24* (2013.01);
(Continued)

(58) Field of Classification Search
CPC .... G06F 13/364; G06F 13/24; G06F 13/1673; G06F 13/4282; G06F 13/362; G06F 13/378
See application file for complete search history.

(56) References Cited

U.S. PATENT DOCUMENTS 3,629,823 A 12/1971 Czernikowski
4,546,351 A 10/1985 Nambu
(Continued)

FOREIGN PATENT DOCUMENTS

CN 1084986 A 4/1994
CN 1333964 A 1/2002
(Continued)

OTHER PUBLICATIONS

"MIPI_Alliance_I3C_Whitepaper—Introduction to the MIPI I3C Standarized Sensor Interface" Aug. 2016, MIPI Alliance.*
(Continued)

*Primary Examiner* — Jing-Yih Shyu
(74) *Attorney, Agent, or Firm* — Loza & Loza LLP

(57) ABSTRACT

A method for enabling 8-bit data word access over a protocol limited to 16-bit data word access is provided. Data may be encapsulated within the lowest 19 bits of a 20-bit number. If it is ascertained that an 8-bit data word is to be used in a system supporting only 16-bit data word access, a byte-enable indicator may be provided within a most significant bit of the 20-bit number while also allocating an 8-bit data region for transfer of the 8-bit data word. The 20-bit number may then be transcoded into a 12-digit ternary number, wherein a residual numerical region is defined as a number space by which a first numerical region defined for the 12-digit ternary number exceeds a second numerical region defined by the lowest 19 bits of the 20-bit number.

30 Claims, 26 Drawing Sheets

Related U.S. Application Data is a continuation-in-part of application No. 14/504,413, filed on Oct. 1, 2014, which is a continuation-in-part of application No. 14/511,160, filed on Oct. 9, 2014, now Pat. No. 9,678,828.

(60) Provisional application No. 61/875,547, filed on Sep. 9, 2013, provisional application No. 61/885,995, filed on Oct. 2, 2013, provisional application No. 61/889,030, filed on Oct. 9, 2013, provisional application No. 62/328,481, filed on Apr. 27, 2016.

(51) Int. Cl.
*G06F 13/16* (2006.01)
*G06F 13/42* (2006.01)
*G06F 13/24* (2006.01)
*G06F 13/378* (2006.01)
*G06F 13/362* (2006.01)

(52) U.S. Cl.
CPC ........ *G06F 13/378* (2013.01); *G06F 13/4282* (2013.01); *G06F 13/362* (2013.01)

(56) References Cited

U.S. PATENT DOCUMENTS

| | | | |
|---|---|---|---|
| 4,697,265 A | 9/1987 | Nozue | |
| 4,800,564 A | 1/1989 | DeFazio et al. | |
| 5,257,270 A | 10/1993 | Hilden et al. | |
| 5,274,647 A | 12/1993 | Tanaka | |
| 5,321,818 A | 6/1994 | Wendling et al. | |
| 5,581,770 A | 12/1996 | Suzuki | |
| 5,613,128 A | 3/1997 | Nizar et al. | |
| 5,687,356 A * | 11/1997 | Basso | H04L 12/433 |
| | | | 370/400 |
| 5,787,263 A | 7/1998 | Tamagawa et al. | |
| 5,818,362 A | 10/1998 | Walker | |
| 5,872,519 A | 2/1999 | Issa et al. | |
| 6,147,963 A | 11/2000 | Walker et al. | |
| 6,191,632 B1 | 2/2001 | Iwata et al. | |
| 6,195,764 B1 * | 2/2001 | Caldara | G06T 9/005 |
| | | | 703/13 |
| 6,253,268 B1 | 6/2001 | Bjoerkengren et al. | |
| 6,359,951 B1 | 3/2002 | Morriss et al. | |
| 6,370,668 B1 | 4/2002 | Garrett, Jr. et al. | |
| 6,532,506 B1 | 3/2003 | Dunstan et al. | |
| 6,609,167 B1 | 8/2003 | Bastiani et al. | |
| 6,617,985 B1 | 9/2003 | Poeppelman | |
| 6,812,824 B1 | 11/2004 | Goldinger et al. | |
| 6,839,393 B1 | 1/2005 | Sidiropoulos | |
| 6,895,057 B1 | 5/2005 | Balachandran et al. | |
| 7,089,338 B1 | 8/2006 | Wooten et al. | |
| 7,707,349 B1 | 4/2010 | Keithley | |
| 7,984,214 B2 | 7/2011 | Heizmann | |
| 8,103,803 B2 | 1/2012 | Reddy et al. | |
| 8,103,896 B2 | 1/2012 | Deshpande | |
| 8,112,551 B2 | 2/2012 | Sullam | |
| 8,411,168 B2 | 4/2013 | Oka | |
| 8,549,198 B2 | 10/2013 | Cohen et al. | |
| 8,629,913 B2 | 1/2014 | Cote et al. | |
| 8,971,469 B2 | 3/2015 | Imai et al. | |
| 9,007,336 B2 | 4/2015 | Shepelev et al. | |
| 2001/0017594 A1 * | 8/2001 | Ahn | G11B 20/14 |
| | | | 341/59 |
| 2002/0024422 A1 | 2/2002 | Turner et al. | |
| 2004/0015752 A1 | 1/2004 | Patella et al. | |
| 2005/0138260 A1 | 6/2005 | Love | |
| 2005/0216815 A1 | 9/2005 | Novotny et al. | |
| 2005/0233789 A1 | 10/2005 | Maekawa | |
| 2006/0152342 A1 | 7/2006 | Turner et al. | |
| 2007/0016694 A1 | 1/2007 | Achler | |
| 2007/0088874 A1 | 4/2007 | Brabant | |
| 2007/0234136 A1 | 10/2007 | Leef et al. | |
| 2007/0297438 A1 | 12/2007 | Meylan et al. | |
| 2008/0005428 A1 | 1/2008 | Maul et al. | |
| 2008/0244370 A1 | 10/2008 | Lam | |
| 2009/0315899 A1 | 12/2009 | Pourbigharaz et al. | |
| 2009/0316724 A1 | 12/2009 | Muukki et al. | |
| 2010/0107039 A1 * | 4/2010 | Toda | G06F 11/1068 |
| | | | 714/764 |
| 2011/0084900 A1 | 4/2011 | Jacobsen et al. | |
| 2011/0111700 A1 | 5/2011 | Hackett | |
| 2011/0239091 A1 * | 9/2011 | Toda | H03M 13/138 |
| | | | 714/767 |
| 2012/0117287 A1 * | 5/2012 | Kashima | G06F 13/36 |
| | | | 710/110 |
| 2012/0137022 A1 | 5/2012 | Cala' | |
| 2012/0259992 A1 | 10/2012 | Koehler et al. | |
| 2013/0018979 A1 | 1/2013 | Cohen et al. | |
| 2013/0039443 A1 | 2/2013 | Garaschenko et al. | |
| 2013/0305119 A1 | 11/2013 | Kern et al. | |
| 2014/0013017 A1 | 1/2014 | Decesaris et al. | |
| 2014/0025999 A1 | 1/2014 | Kessler | |
| 2014/0286466 A1 | 9/2014 | Sengoku et al. | |
| 2014/0337553 A1 | 11/2014 | Du et al. | |
| 2015/0030112 A1 | 1/2015 | Wiley et al. | |
| 2015/0046616 A1 | 2/2015 | Pedersen et al. | |
| 2015/0074305 A1 | 3/2015 | Sengoku et al. | |
| 2015/0095537 A1 | 4/2015 | Sengoku | |
| 2015/0100713 A1 | 4/2015 | Sengoku | |
| 2015/0100862 A1 | 4/2015 | Sengoku | |
| 2015/0199287 A1 | 7/2015 | Sengoku | |
| 2015/0199295 A1 | 7/2015 | Sengoku | |
| 2015/0234774 A1 * | 8/2015 | Sengoku | G06F 13/4295 |
| | | | 710/106 |
| 2015/0248373 A1 | 9/2015 | Sengoku | |
| 2016/0147684 A1 | 5/2016 | Sengoku | |
| 2016/0217090 A1 * | 7/2016 | Sengoku | G06F 13/364 |

FOREIGN PATENT DOCUMENTS

| | | |
|---|---|---|
| CN | 101835249 A | 9/2010 |
| CN | 102016975 A | 4/2011 |
| CN | 102591834 A | 7/2012 |
| DE | 10250616 C1 | 11/2003 |
| EP | 0192944 A2 | 9/1986 |
| EP | 0588191 A1 | 3/1994 |
| GB | 2173929 A | 10/1986 |
| JP | H05282244 A | 10/1993 |
| JP | 2006120146 A | 5/2006 |
| JP | 2012194829 A | 10/2012 |
| WO | WO-0042740 A1 | 7/2000 |
| WO | WO-2013052886 A2 | 4/2013 |

OTHER PUBLICATIONS

"FAQ for MIPI I3C Version 1.0" MIPI Alliance, Dec. 8, 2017.*
Chen I A., et al., "An error-correction scheme with Reed-Solomon codec for CAN bus transmission", Intelligent Signal Processing and Communications Systems (ISPACS), 2011 International Symposium on, IEEE, Dec. 7, 2011, pp. 1-5, XP032114635, DOI: 10.1109/ISPACS.2011.6146059 ISBN: 978-1-4577-2165.
Corrigan S: "Introduction to the Controller Area Network (CAN)—Application ReportSLOA101AAugust 2002, Revised Jul. 2008", internet article, Jul. 30, 2008 (Jul. 30, 2008), XP002740955, texas Instruments Retrieved from the Internet: URL: http://www.ti.com/lit/an/sloa101a/sloa101a.pdf [retrieved on Jun. 16, 2015] the whole document paragraph [3.1.1].
"I2C—Inter-IC Corrununications, Lectures 28, Oct. 26-29, 2012", internet article, Oct. 29, 2012 (Oct. 29, 2012), XP002740959, Retrieved from the Internet: URL: http://ece.uidaho.edu/ee/classes/ECE340/LectureNotes/L27/I2C.pdf [retrieved on Jun. 16, 2015] the whole document page 2.
Shanley T., et al., "PCI System Architecture—Edition 4th, Chapter 5 (106-119) and 14part (291-297)" In: May 31, 1999 (May 31, 1999), Addison-Wesley, XP055145686, the whole document.
"Tradeoffs when considering SPI or I2C?", internet article, Apr. 1, 2012, XP002735900, Retrieved from the Internet:URL:http://elec-

(56) References Cited

OTHER PUBLICATIONS tronics.stackexchange.com/questions/29037/tradeoffs-when-considering-spi-or-i2c [retrieved on Feb. 12, 2015].

* cited by examiner

*EXEMPLARY IMAGE FRAME INTERRUPT TRANSMISSION*

| Parity Bit | Works with Data Bits | Notes |
|---|---|---|
| P1 | 15, 13, 11, 9, 7, 5, 3, 1 | P1 bit is XOR of all the odd index data bits |
| P0 | 14, 12, 10, 8, 6, 4, 2, 0 | P0 bit is XOR of all the even index data bits |

*FIG. 6*

$$\begin{aligned}
\text{Bits} = {} & T_{11} \times 3^{11} \\
+ {} & T_{10} \times 3^{10} \\
+ {} & T_9 \times 3^9 \\
+ {} & T_8 \times 3^8 \\
+ {} & T_7 \times 3^7 \\
+ {} & T_6 \times 3^6 \\
+ {} & T_5 \times 3^5 \\
+ {} & T_4 \times 3^4 \\
+ {} & T_3 \times 3^3 \\
+ {} & T_2 \times 3^2 \\
+ {} & T_1 \times 3 \\
+ {} & T_0
\end{aligned}$$

*FIG. 12*

$$T_{11} = \text{Bits} / 3^{11} \quad , \quad M_{11} = \text{Bits} \% 3^{11}$$
$$T_{10} = M_{11} / 3^{10} \quad , \quad M_{10} = M_{11} \% 3^{10}$$
$$T_9 = M_{10} / 3^9 \quad , \quad M_9 = M_{10} \% 3^9$$
$$T_8 = M_9 / 3^8 \quad , \quad M_8 = M_9 \% 3^8$$
$$T_7 = M_8 / 3^7 \quad , \quad M_7 = M_8 \% 3^7$$
$$T_6 = M_7 / 3^6 \quad , \quad M_6 = M_7 \% 3^6$$
$$T_5 = M_6 / 3^5 \quad , \quad M_5 = M_6 \% 3^5$$
$$T_4 = M_5 / 3^4 \quad , \quad M_4 = M_5 \% 3^4$$
$$T_3 = M_4 / 3^3 \quad , \quad M_3 = M_4 \% 3^3$$
$$T_2 = M_3 / 3^2 \quad , \quad M_2 = M_3 \% 3^2$$
$$T_1 = M_2 / 3 \quad , \quad M_1 = M_2 \% 3$$
$$T_0 = M_1$$

*FIG. 13*

$$T_{11} = (\text{Bits} \geq 3^{11} \times 2)\,?\,2 : (\text{Bits} \geq 3^{11})\,?\,1 : 0\,,\quad M_{11} = \text{Bits} - T_{11} \times 3^{11}$$
$$T_{10} = (M_{11} \geq 3^{10} \times 2)\,?\,2 : (M_{11} \geq 3^{10})\,?\,1 : 0\,,\quad M_{10} = M_{11} - T_{10} \times 3^{10}$$
$$T_{9} = (M_{10} \geq 3^{9} \times 2)\,?\,2 : (M_{10} \geq 3^{9})\,?\,1 : 0\,,\quad M_{9} = M_{10} - T_{9} \times 3^{9}$$
$$T_{8} = (M_{9} \geq 3^{8} \times 2)\,?\,2 : (M_{9} \geq 3^{8})\,?\,1 : 0\,,\quad M_{8} = M_{9} - T_{8} \times 3^{8}$$
$$T_{7} = (M_{8} \geq 3^{7} \times 2)\,?\,2 : (M_{8} \geq 3^{7})\,?\,1 : 0\,,\quad M_{7} = M_{8} - T_{7} \times 3^{7}$$
$$T_{6} = (M_{7} \geq 3^{6} \times 2)\,?\,2 : (M_{7} \geq 3^{6})\,?\,1 : 0\,,\quad M_{6} = M_{7} - T_{6} \times 3^{6}$$
$$T_{5} = (M_{6} \geq 3^{5} \times 2)\,?\,2 : (M_{6} \geq 3^{5})\,?\,1 : 0\,,\quad M_{5} = M_{6} - T_{5} \times 3^{5}$$
$$T_{4} = (M_{5} \geq 3^{4} \times 2)\,?\,2 : (M_{5} \geq 3^{4})\,?\,1 : 0\,,\quad M_{4} = M_{5} - T_{4} \times 3^{4}$$
$$T_{3} = (M_{4} \geq 3^{3} \times 2)\,?\,2 : (M_{4} \geq 3^{3})\,?\,1 : 0\,,\quad M_{3} = M_{4} - T_{3} \times 3^{3}$$
$$T_{2} = (M_{3} \geq 3^{2} \times 2)\,?\,2 : (M_{3} \geq 3^{2})\,?\,1 : 0\,,\quad M_{2} = M_{3} - T_{2} \times 3^{2}$$
$$T_{1} = (M_{2} \geq 3 \times 2)\,?\,2 : (M_{2} \geq 3)\,?\,1 : 0\,,\quad M_{1} = M_{2} - T_{1} \times 3$$
$$T_{0} = M_{1}$$

*FIG. 14*

*Exemplary Bit 19 Space and Mapping*

| Ternary | Bits[19:0] | | Address | Write | Read | Bit[19] | | | | | | | | | | | | | | |
|---|---|---|---|---|---|---|---|---|---|---|---|---|---|---|---|---|---|---|---|---|
| | | | | | | 19 | 12 | 11 | 10 | 9 | 8 | 7 | 6 | 5 | 4 | 3 | | | | |
| 2222_2222_2222₃ | 0x81BF0 | 0x31 (49)↑ | SEE FIG. 17 | | 1602 | 1 | 1 | 1 | 1 | 1 | 1 | 1 | 1 | ? | ? | ? | | | | |
| 2222_2222_1012₃ | 0x81BC0 | | | | | 1 | 1 | 1 | 1 | 1 | 1 | 1 | 0 | X | X | X | | | | |
| 2222_2222_1011₃ | 0x81BBF | | | | | 1 | 1 | 1 | 1 | 1 | 1 | 0 | X | X | X | X | | | | |
| [6-bits] 0x40 (64)↑ | | | | | | | | | | | | | | | | | | | | |
| 2222_2221_1211₃ | 0x81B80 | | | Reserved | Reserved | 1 | 1 | 1 | 1 | 1 | 0 | X | X | X | X | X | | | | |
| 2222_2221_1210₃ | 0x81B7F | | | | | 1 | 1 | 1 | 1 | 0 | X | X | X | X | X | X | | | | |
| [7-bits] 0x80 (128)↑ | | | | | | | | | | | | | | | | | | | | |
| 2222_2220_0002₃ | 0x81B00 | | | Reserved | Reserved | 1 | 1 | 1 | 0 | X | X | X | X | X | X | X | | | | |
| 2222_2220_0001₃ | 0x81AFF | | | | | 1 | 1 | 0 | X | X | X | X | X | X | X | X | | | | |
| [8-bits] 0x100 (256)↑ | | | | | | | | | | | | | | | | | | | | |
| 2222_2202_2121₃ | 0x81A00 | | | Slave to slave grant | Slave to slave request | 1 | 0 | X | X | X | X | X | X | X | X | X | | | | |
| 2222_2202_2120₃ | 0x819FF | | | | | | | | | | | | | | | | | | | |
| [9-bits] 0x200 (512)↑ | | | | | | | | | | | | | | | | | | | | |
| 2222_2112_1122₃ | 0x81800 | | | | | | | | | | | | | | | | | | | |
| 2222_2112_1121₃ | 0x817FF | | | CCIe register address | Master bus request | 1 | 0 | X | X | X | X | X | X | X | X | X | | | | |
| [11-bits] 0x800 (2048)↑ | | | | | | | | | | | | | | | | | | | | |
| 2222_1121_0210₃ | 0x81000 | | | | | | | | | | | | | | | | | | | |
| 2222_1121_0202₃ | 0x80FFF | | | 8-bit CHK | 8-bit CHK | 1 | 0 | X | X | X | X | X | X | X | X | X | | | | |
| [12-bits] 0x1000 (4096)↑ | | | | | | | | | | | | | | | | | | | | |
| 2222_2201_0002₃ | 0x80000 | | | | | | | | | | | | | | | | | | | |
| 2221_2201_2001₃ | 0x7FFFF | | | 19-bit data region | | 0 | X | X | X | X | X | X | X | X | X | X | | | | |
| 0x80000 (524288)↑ | | | | | | | | | | | | | | | | | | | | |
| 0000_0000_0000₃ | 0x00000 | | | | | | | | | | | | | | | | | | | |

Bit[19] = 1

*FIG. 16*

*Exemplary Bit 19 Space and Mapping (continued)*

| Ternary | Bits[19:0] | Address | Write | Read | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| 2222_2222_2222₃ | 0x81BF0 | _SY_ | Prohibited | Prohibited | 1 | 1 | 1 | 1 | 1 | 1 | 1 | 1 | 1 | 1 | 1 | 1 | 1 | 1 | 1 | 1 | 0 | 0 | 0 | 0 |
| 2222_2222_2221₃ 0x2A (42) ↑ | 0x81BEF 0x81BC6 | | Prohibited | | | | | | | | | | | | | | | | | | | | | |
| 2222_2222_1102₃ | | | | | | | | | | | | | | | | | | | | | | | | | |
| 2222_2222_1101₃ | 0x81BC5 | Heartbeat / -NCJ | | Prohibited | 1 | 1 | 1 | 1 | 1 | 1 | 1 | 1 | 1 | 1 | 1 | 1 | 1 | 0 | 0 | 0 | 0 | 0 | 1 | 1 |
| 2222_2222_1100₃ 0x2A (42) ↑ | 0x81BC4 0x81BBB | | Prohibited | | | | | | | | | | | | | | | | | | | | | |
| 2222_2222_1000₃ | | Filler ^ | | | | | | | | | | | | | | | | | | | | | | | |
| 2222_2222_0222₃ | 0x81BBA | | | | | | | | | | | | | | | | | | | | | | | | |
| 2222_2222_0221₃ | 0x81BB9 | Reserved | | Reserved | 1 | 1 | 1 | 1 | 1 | 1 | 1 | 1 | 1 | 1 | 1 | 0 | 1 | 1 | 0 | 1 | 1 | 1 | 0 | 1 |
| 2222_2222_0220₃ | 0x81BB8 | Reserved | | Reserved | 1 | 1 | 1 | 1 | 1 | 1 | 1 | 1 | 1 | 1 | 1 | 0 | 1 | 1 | 0 | 1 | 1 | 1 | 0 | 0 |
| 2222_2222_0212₃ [3-bits] 0x8 (8) ↑ | 0x81BB7 | Reserved | | Reserved | 1 | 1 | 1 | 1 | 1 | 1 | 1 | 1 | 1 | 1 | 1 | 0 | 1 | 0 | 1 | 1 | 1 | 0 | 0 | 0 |
| 2222_2222_0121₃ | | | | | | | | | | | | | | | | | | | | | | | | | |
| 2222_2222_0120₃ [4-bits] 0x10 (16) ↑ | 0x81BAF | | | Reserved | 1 | 1 | 1 | 1 | 1 | 1 | 1 | 1 | 1 | 1 | 1 | 1 | 0 | 0 | 1 | 1 | 0 | x | x | x |
| 2222_2222_0000₃ | 0x81BA0 | | | Reserved | 1 | 1 | 1 | 1 | 1 | 1 | 1 | 1 | 1 | 1 | 1 | 0 | 0 | 0 | 1 | 0 | x | x | x | x |
| 2222_2221_2222₃ 0x10 (16) ↑ | 0x81B9F | | Prohibited | | | | | | | | | | | | | | | | | | | | | |
| 2222_2221_2102₃ | 0x81B90 | | | | | | | | | | | | | | | | | | | | | | | | |
| 2222_2221_2101₃ | 0x81B8F | Prohibited | SID scan resp | Prohibited | 1 | 1 | 1 | 1 | 1 | 1 | 1 | 1 | 1 | 1 | 1 | 1 | 0 | 0 | 0 | 0 | 1 | 0 | 0 | 0 |
| 2222_2222_2100₃ 0xA (10) ↑ | 0x81B8E | | Prohibited | | | | | | | | | | | | | | | | | | | | | |
| 2222_2221_2000₃ | 0x81B85 | | | | | | | | | | | | | | | | | | | | | | | | |
| 2222_2221_1222₃ | 0x81B84 | | | Reserved | 1 | 1 | 1 | 1 | 1 | 1 | 1 | 1 | 1 | 1 | 1 | 0 | 0 | 0 | 0 | 0 | 0 | 0 | 1 | 0 |
| 2222_2221_1221₃ [2-bits] 0x4 (4) ↑ | 0x81B83 | | | Reserved | 1 | 1 | 1 | 1 | 1 | 1 | 1 | 1 | 1 | 1 | 1 | 0 | 0 | 0 | 0 | 0 | 0 | 0 | x | x |
| 2222_2221_1211₃ | 0x81B80 | | | | | | | | | | | | | | | | | | | | | | | | |

*FIG. 17*

I3C HIGH DATA RATE (HDR) ALWAYS-ON IMAGE SENSOR 8-BIT OPERATION INDICATOR AND BUFFER OVER THRESHOLD INDICATOR

The present Application for Patent claims priority to:

U.S. Utility application Ser. No. 14/480,540, filed Sep. 8, 2014, issued as U.S. Pat. No. 9,519,603, on Dec. 13, 2016, which claims priority to U.S. Provisional Application No. 61/875,547, filed Sep. 9, 2013, U.S. Utility application Ser. No. 14/504,413, filed Oct. 1, 2014, issued as U.S. Pat. No. 9,678,828 on Jun. 13, 2017, which claims priority to U.S. Provisional Application No. 61/885,995, filed Oct. 2, 2013, U.S. Utility application Ser. No. 14/511,160, filed Oct. 9, 2014, which claims priority to U.S. Provisional Application No. 61/889,030, filed Oct. 9, 2013, and U.S. Provisional App. No. 62/328,481 filed Apr. 27, 2016, all assigned to the assignee hereof and hereby expressly incorporated by reference herein.

FIELD

The present disclosure pertains to techniques to permit devices to operate over a I2C/I3C multi-mode control data bus and, more particularly provides support for an I3C-compatible High Data Rate (HDR) mode using byte-size access while also providing underflow and overflow prevention at image sensors.

BACKGROUND

I2C (also referred to as $I^2C$) is a multi-master serial single-ended bus used for attaching low-speed peripherals to a motherboard, embedded system, cellphone, or other electronic devices. The I2C bus includes a clock (SCL) and data (SDA) lines with 7-bit addressing. The bus has two roles for devices: master and slave. A master device is a node that generates the clock and initiates communication with slave devices. A slave device is a node that receives the clock and responds when addressed by the master device.

I3C is a sensor interface proposed by the MIPI Alliance for sensor integration with mobile devices, and embedded system applications. The MIPI I3C specification defines a two-pin interface that is intended to be backward compatible with legacy I2C buses. However, there are challenges in implementing some aspects of the I3C over legacy I2C buses.

Current I3C (latest v0.8 r04) does not provide "byte enable" mechanism in any of the three HDR (high data rate) modes (DDR, TSL, or TSP); only 16-bit per word transfer is supported in a HDR mode.

Camera system, especially newly developed CCS (camera command set) defines byte level registers, and requires byte level register transfer. For example if there are two registers A and B, where both are 8-bit registers and are located in adjacent addresses (e.g., address 0x0004 for A and address 0x0005 for B), HDR cannot be used when the host needs to write only to register B. The host has to use slow SDR (single data rate) mode. Also, since most register access should be done in bulk, meaning multiple registers being accessed in burst, in HDR to save time and power, and target registers often contain different sizes, 8-bit, 16-bit, 32-bit, or larger, "on-the-fly" byte enable scheme is desired in order to "mask" or "skip" certain registers to be written while others are written in bulk.

Therefore, solutions are needed that support I3C features over a legacy I2C bus.

SUMMARY

A first aspect provides a method for facilitating changing word size access in a system supporting a different word size access. It may be ascertained that a w-bit data word is to be used in a system supporting only y-bit data word access, where w and y are positive integers. Data may be encapsulated within the lowest n−1 bits of an n-bit number, where n is a positive integer and n−1 is equal to or greater than y. A data word-size change indicator may be provided within a most significant bit of the n-bit number while also allocating a w-bit data region for transfer of the w-bit data word. The n-bit number may then be transcoded into a k-digit odd numerical base number, where k is a positive integer and the k-digit odd numerical base number defines a first numerical region that is larger than a second numerical region defined by a n−1-bit number space, and the n-bit number is limited to a residual numerical region defined as a number space by which the first numerical region exceeds the second numerical region. Then, the k-digit odd numerical base number may be transcoded into symbols for transmission over a bus. The residual numerical region may be accessed by setting the most significant bit of the n-bit number to one (1).

In one example, the n-bit number may be 20 bits long and the k-digit odd numerical base number is a ternary number that is 12 digits long. For instance, the most significant bit of the n-bit number may be the $20^{th}$ bit of the n-bit number and may define at least one 256 state regions. In other exemplary instances, the most significant bit of the n-bit number may be the $20^{th}$ bit of the n-bit number and may define two (2) 256 state regions. The lowest n−1 bits of the n-bit number may include an I3C high data rate (HDR) binary sequence.

According to one feature, prior to or concurrent with a read operation, a buffer empty condition for a transmission buffer may be ascertained. Filler data may then be transmitted if the buffer empty condition is ascertained, where such filler data is within the n-bit number.

According to another feature, an over threshold condition may be ascertained for a transmission buffer. At least one bit of the n-bit number may be set as an over threshold indicator to indicate the over threshold condition for the transmission buffer.

Image data captured by an image sensor may be written to the transmission buffer, wherein the image data is included in the lowest n−1 bits of the n-bit number. Image data may be sent from the transmission buffer to a receiving device over a control data bus according to requests from the receiving device.

A numerical space capable of being represented by the n-bit number may be larger than the first numerical region capable of being defined by the k-digit odd numerical base number.

In one example, in a first mode of operation, the lowest n−1 bits of the n-bit number may encapsulate a first protocol, and in a second mode of operation, the n-bit number may encapsulate a second protocol.

A second aspect provides an image sensor device, comprising an image sensor, a transmission buffer, a communication interface, and/or a control circuit. The image sensor may serve to capture image data. The transmission buffer may serve to store the captured image data. The communication interface may serve to couple to a single-ended control data bus according to requests from a receiving device. The control circuit coupled to the image sensor, the transmission buffer, and the communication interface, the control circuit configured to: (a) ascertain that a w-bit data word is to be used in a system supporting only y-bit data word access, where w and y are positive integers; (b) encapsulate data within the lowest n−1 bits of an n-bit number, where n is a positive integer and n−1 is equal to or greater than y; (c) provide a data word-size change indicator within a most significant bit of the n-bit number while also allocating a w-bit data region for transfer of the w-bit data word; and/or (d) transcode the n-bit number into a k-digit odd numerical base number, where k is a positive integer and the k-digit odd numerical base number defines a first numerical region that is larger than a second numerical region defined by a n−1-bit number space, and the n-bit number is limited to a residual numerical region defined as a number space by which the first numerical region exceeds the second numerical region. The n-bit number may be, for example, 20 bits long and the k-digit odd numerical base number is a ternary number that is 12 digits long.

The most significant bit of the n-bit number may be the $20^{th}$ bit of the n-bit number and may define at least one 256 state regions. The most significant bit of the n-bit number may be the $20^{th}$ bit of the n-bit number and may define two (2) 256 state regions.

The control circuit may also be further configured to: (a) ascertain a buffer empty condition for the transmission buffer; and/or (b) transmit filler data if the buffer empty condition is ascertained.

The control circuit may also be further configured to: (a) ascertain an over threshold condition for the transmission buffer; and/or (b) set at least one bit of the n-bit number as an over threshold indicator to indicate the over threshold condition for the transmission buffer.

The control circuit may be further configured to: (a) write image data captured by an image sensor to the transmission buffer, wherein the image data is included in the n-bit number; and/or (b) send image data from the transmission buffer to a receiving device over the control data bus according to requests from the receiving device.

A third aspect provides a method for enabling 8-bit data word access over a protocol limited to 16-bit data word access. It may be ascertained that an 8-bit data word is to be used in a system supporting only 16-bit data word access. If so, data may be encapsulated within the lowest 19 bits of a 20-bit number. A byte-enable indicator may be provided within a most significant bit of the 20-bit number while also allocating an 8-bit data region for transfer of the 8-bit data word. The 20-bit number may be transcoded (converted) into a 12-digit ternary number, wherein a residual numerical region is defined as a number space by which a first numerical region defined for the 12-digit ternary number exceeds a second numerical region defined by the lowest 19 bits of the 20-bit number. The 20-bit number may be limited the number space within the residual numerical region. The most significant bit of the 20-bit number may serve to define a number space with at least two (2) 256 state regions. The lowest 19 bits of the 20-bit number may include an I3C high data rate (HDR) binary sequence.

In one feature, prior to or concurrent with a read operation, a buffer empty condition may be ascertained for a transmission buffer. Filler data may be transmitted if the buffer empty condition is ascertained, where such filler data is within the n-bit number.

In another feature an over threshold condition may be ascertained for a transmission buffer. At least one bit of the 20-bit number may be set as an over threshold indicator to indicate the over threshold condition for the transmission buffer.

Image data captured by an image sensor may be written to the transmission buffer, wherein the image data is included in the lowest 19 bits of the 20-bit number. Image data may be sent from the transmission buffer to a receiving device over a control data bus according to requests from the receiving device.

A fourth aspect provides an image sensor device, comprising: an image sensor, a transmission buffer, a communication interface, and/or a control circuit. The image sensor may serve to capture image data. The transmission buffer may serve to store the captured image data. The communication interface may serve to couple to a single-ended control data bus according to requests from a receiving device. The control circuit may be configured to: (a) ascertain that an 8-bit data word is to be used in a system supporting only 16-bit data word access; (b) encapsulate data within the lowest 19 bits of a 20-bit number; (c) provide a byte-enable indicator within a most significant bit of the 20-bit number while also allocating an 8-bit data region for transfer of the 8-bit data word; and/or (d) transcode the 20-bit number into a 12-digit ternary number, wherein a residual numerical region is defined as a number space by which a first numerical region defined for the 12-digit ternary number exceeds a second numerical region defined by the lowest 19 bits of the 20-bit number.

DRAWINGS

Various features, nature, and advantages may become apparent from the detailed description set forth below when taken in conjunction with the drawings in which like reference characters identify correspondingly throughout.

FIG. 6 illustrates an exemplary use of the conventional parity bits P1 and P0 within the I3C protocol.

FIG. 12 illustrates a general example of converting a ternary number (base-3 number) to a binary number, where each T in {T11, T10, . . . T2, T1, T0} is a symbol transition number.

FIG. 13 illustrates an exemplary method for converting a binary number (bits) to a 12 digit ternary number (base-3 number).

FIG. 14 illustrates an example of one possible implementation of the division and the module operations of the FIG. 13, which may be synthesizable by any commercial synthesis tools.

FIG. 16 illustrates an exemplary mapping for the bit 19 numerical space.

FIG. 17 illustrates an exemplary mapping for a portion of the bit 19 numerical space of FIG. 16.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.
Overview A first aspect provides a method to transcode data/information between a binary number space and an odd numerical base number space (e.g., ternary, quinary, septenary, nonary, etc., number space) and utilizing an excess/residual numerical space within a k-digit odd numerical base number to encode other information (e.g., an overlay protocol, a control protocol, extended protocol, etc.) without incurring any additional digits in the k-digit odd numerical base number.

A second aspect provides a method to provide 8-bit word access in a system supporting only 16-bit word access. In a system supporting only 16-bit data word access, data may be encapsulated or encoded within the lowest 19 bits of a 20-bit number. The 20-bit number may be transcoded (e.g., converted) into a 12-digit ternary number, wherein a residual numerical region is defined by a number space by which a first numerical region defined for the 12-digit ternary number exceeds a second numerical region defined by the lowest 19 bits of the 20-bit number. Additional information may be encoded within this residual numerical region without the need to add digits to the 12-digit ternary number.

Figure 1:
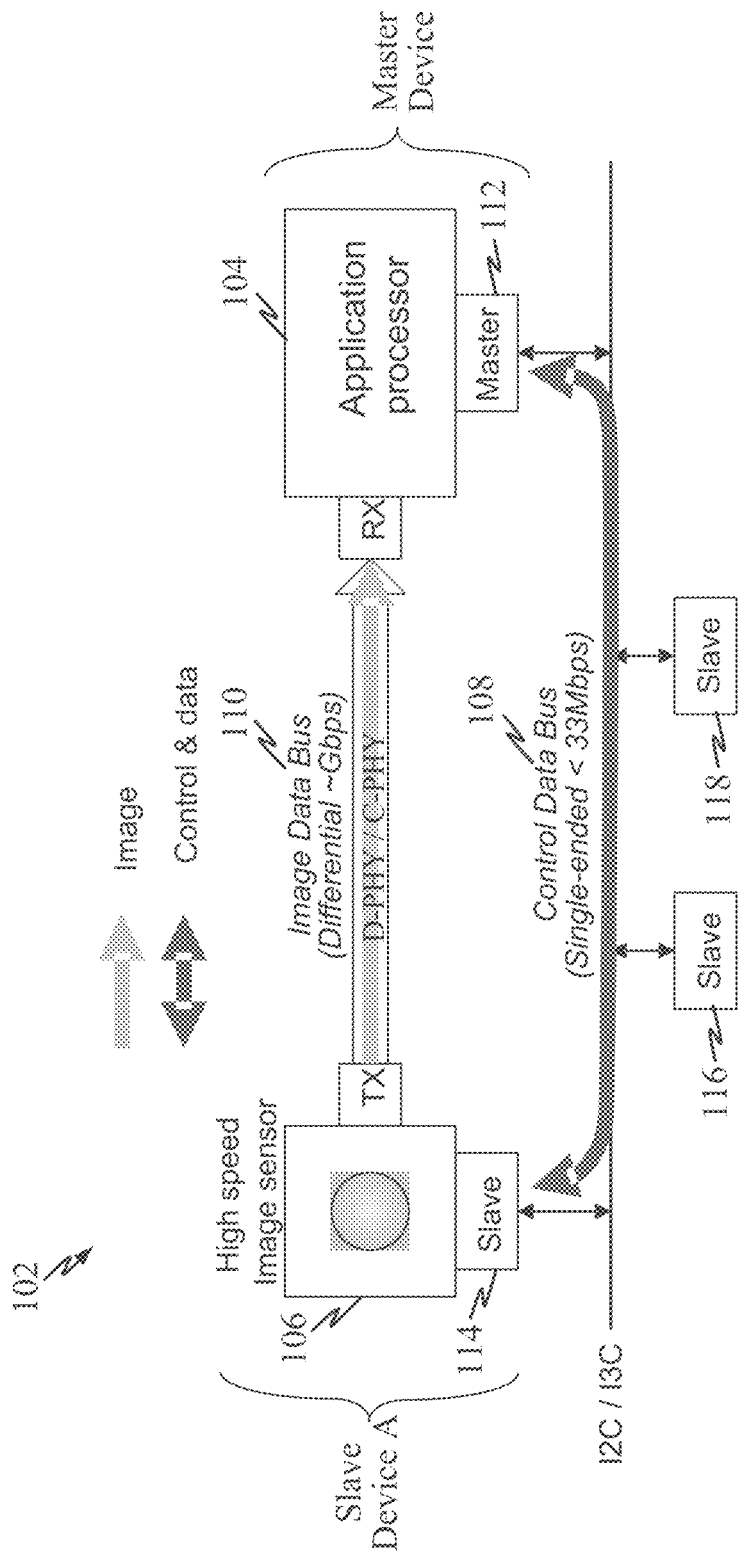
FIG. 1 is a block diagram illustrating a device having an application processor and an image sensor and implementing an image data bus and a multi-mode control data bus.

A third aspect provides a byte-enable indicator (e.g., indicating an 8-bit data word access instead of a 16-bit data word access within the particular 20-bit number) within a most significant bit of the 20-bit number while also allocating an 8-bit data region for transfer of the 8-bit data word.
Exemplary Operating Environment FIG. 1 is a block diagram illustrating a device 102 having an application processor 104 and an image sensor 106 and implementing an image data bus 110 and a multi-mode control data bus 108. This example illustrates a first mode of operation in which image data may be sent from the image sensor 106 to the application processor 104 over an image data bus 110 (e.g., a high speed differential D-PHY or C-PHY bus) while the control data bus 108 is used for control signaling. In one example, the image sensor 106 simply transmits data over the image data bus 110 to the application processor 104 whenever it has image data available. For instance, the image sensor may operate as a "host" for image data transfer since it can initiate transfer whenever the image data is ready to be sent. This may be referred to as "push" type image data streaming since the image sensor pushes the data to the application processor. A master device (e.g., a master interface 112 coupled to or integrated with the application processor 104) may manage communications with a plurality of slave devices (e.g., a slave interface 114, 116, and 118 coupled to or integrated with an image sensor 106, 216, 218) over the control data bus 108.

The control data bus 108 may comprise two wires, for example, a clock line (SCL) and a serial data line (SDA). In I2C mode, the clock line SCL may be used to synchronize all data transfers over the data line SDA. In I3C mode, both the clock line SCL and data line SDL may be used to transmit data.

In one example, the control data bus 108 may be shared (e.g., concurrently used) by the master device and the plurality of slave devices using single-ended communications/interfaces.

It should be clear that the shared control data bus 108 may be capable of operating in different modes (e.g., a first mode such as I2C communications, a second mode such as I3C communications, etc.).

Figure 2:
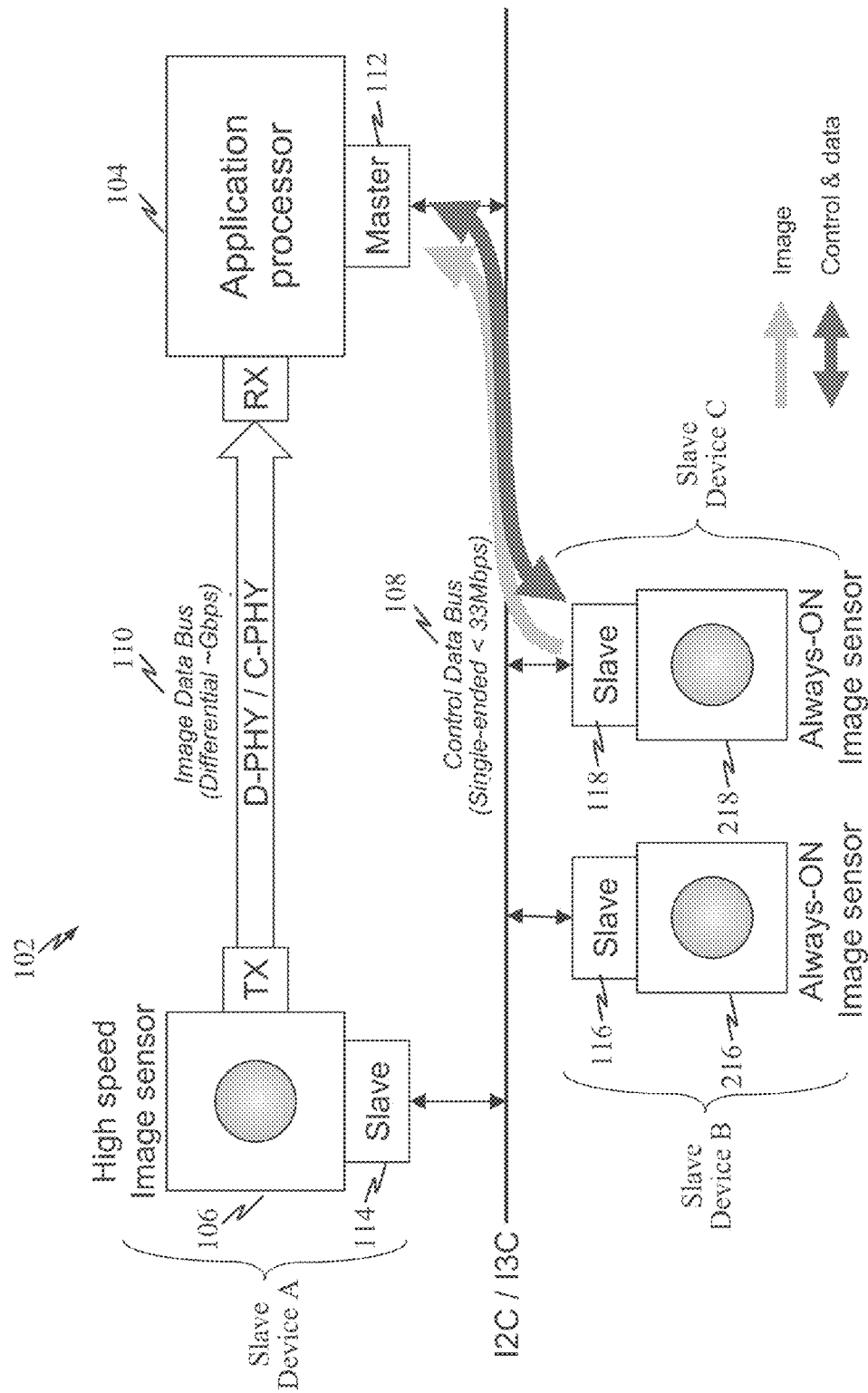
FIG. 2 is a block diagram illustrating the device (FIG. 1) where the multi-mode control data bus operates according to a second mode in which always-on image sensors send image data over the control data bus.

FIG. 2 is a block diagram illustrating the device 102 (FIG. 1) where the multi-mode control data bus 108 operates according to a second mode in which always-on image sensors send image data over the control data bus 108. In this second mode, the always-on image sensors 216 and 218 may continuously capture image data and buffer it for transmission to the application processor 104. That is, a control circuit may obtain image/pixel data captured by the image sensor and writes it to the image buffer. The corresponding slave interface 116 and 118 for each image sensor 216 and 218 may issue an in-band interrupt (IBI) when there is image data to be transmitted to the master device (e.g., application processor 104 and master interface 112). The master device may then initiate retrieval (e.g., through read operations) of the image data from the slave device that issued the in-band interrupt. Consequently, the master device receives image data/pixels from the slave device.

Figure 3:
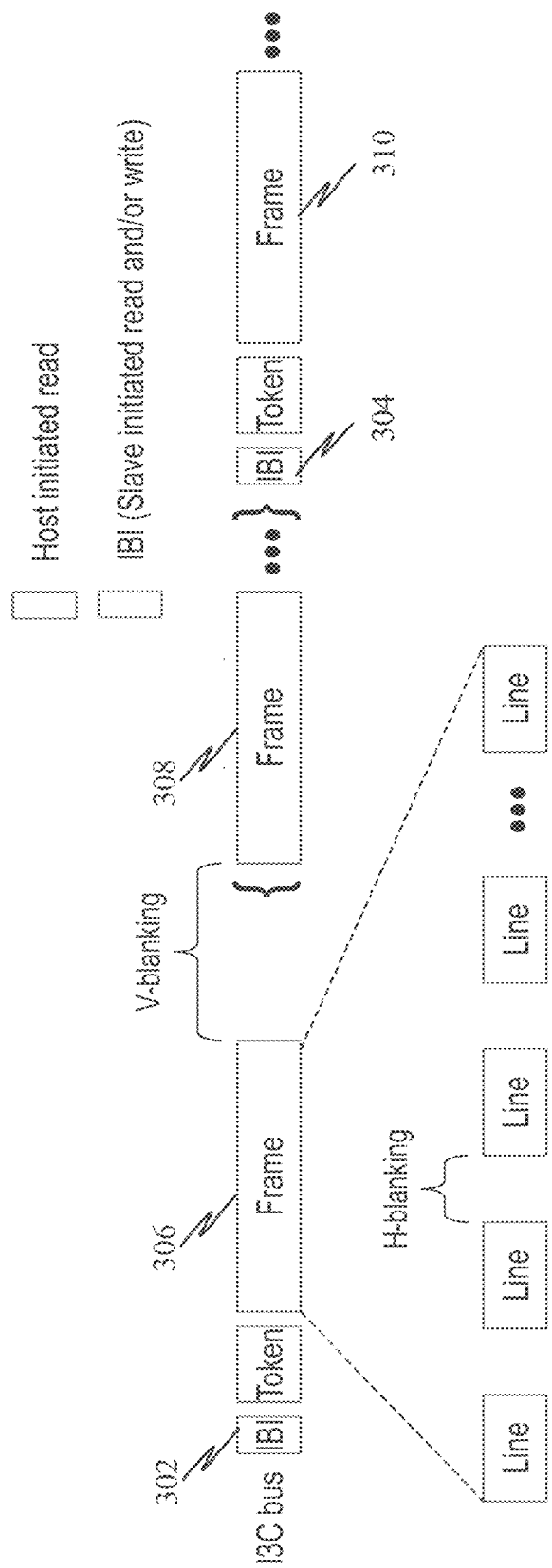
FIG. 3 illustrates exemplary image streaming and in-band interrupt transmission over the control data bus according to the second mode (e.g., I3C protocol).

FIG. 3 illustrates exemplary image streaming and in-band interrupt transmission over the control data bus according to the second mode (e.g., I3C protocol). In this approach, in-band interrupts 302 and 304 may be generated by image sensors and transmitted over the control data bus when image data is ready to be sent. In one approach, an in-band interrupt 302 and 304 may be sent with each frame 306 and 310. In another approach, an in-band interrupt 302 may be sent for a plurality (a series) of frames 306 and 308.

However, the data retrieval process has the risk of underflow or overflow of the buffer (e.g., a pixel buffer, a first-in first out (FIFO) buffer, etc.) on the slave device. That is, if the data rate at which image data is retrieved from an image sensor exceeds the rate at which the image data is captured by the image sensor, then an underflow condition may occur. Likewise, if the data rate at which image data is retrieved from an image sensor is less than the rate at which the image data is captured by the image sensor, then an overflow condition may occur. Consequently, the master device needs to have a mechanism to prevent underflow and overflow of buffers for each image sensor.

In the I3C protocol, high data rate (HDR) protocols are provided which support 16-bit size operations (i.e., 16-bits per word). However, there is no method or support in the I3C protocol permitting 8-bit size operations (i.e., byte-size or high/low byte access).

Figure 4:
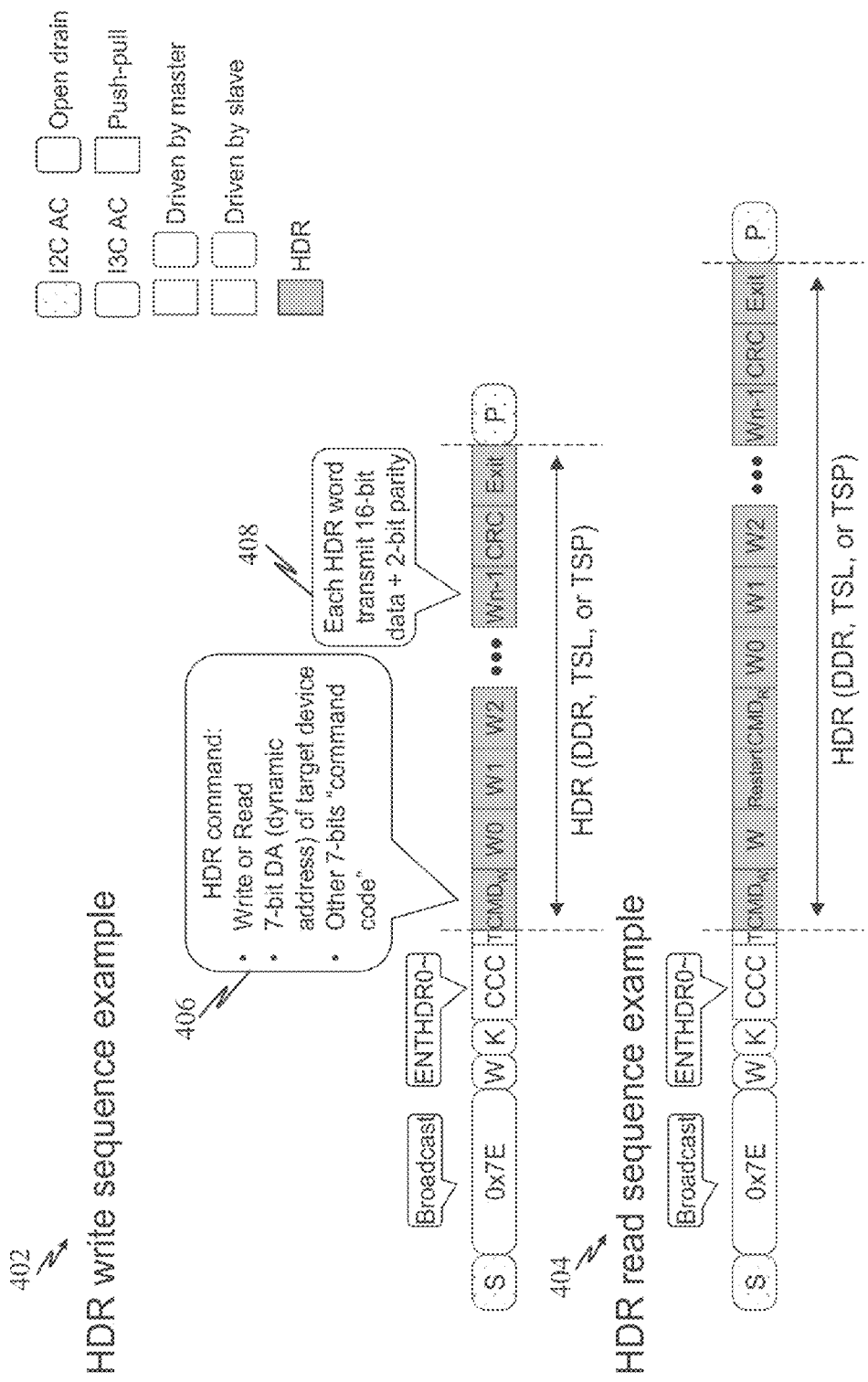
FIG. 4 illustrates an exemplary format for an I3C HDR write sequence and read sequence.

FIG. 4 illustrates an exemplary format for an I3C HDR write sequence 402 and read sequence 404. In some examples, the HDR mode may include DDR (double data rate), TSL (ternary symbol legacy inclusive bus), and/or TSP (ternary symbol pure bus). An HDR command word 406 may include a write/read indicator, a 7-bit target device address, and 7-bit additional commands. Also, each HDR word 408 includes 16-bits of data plus 2 parity bits (e.g., P1 and P0).

Figure 5:
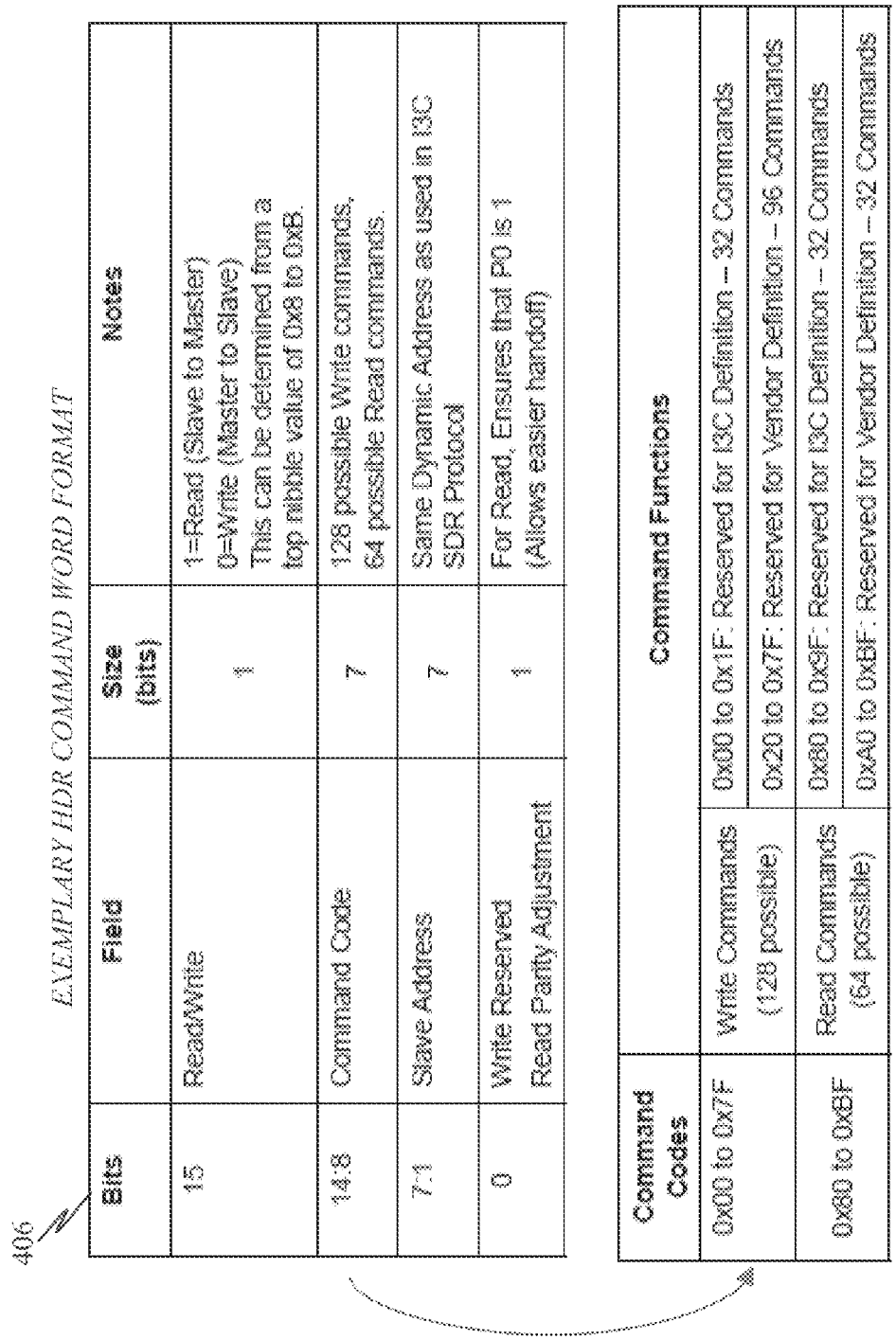
FIG. 5 illustrates the exemplary I3C HDR command word format.

FIG. 5 illustrates the exemplary I3C HDR command word format 406.

FIG. 6 illustrates an exemplary use of the conventional parity bits P1 and P0 within the I3C protocol. That is, a first parity bit P1 may be used for odd-indexed bits while a second parity bit P0 may be used for even-indexed bits.

Figure 7:
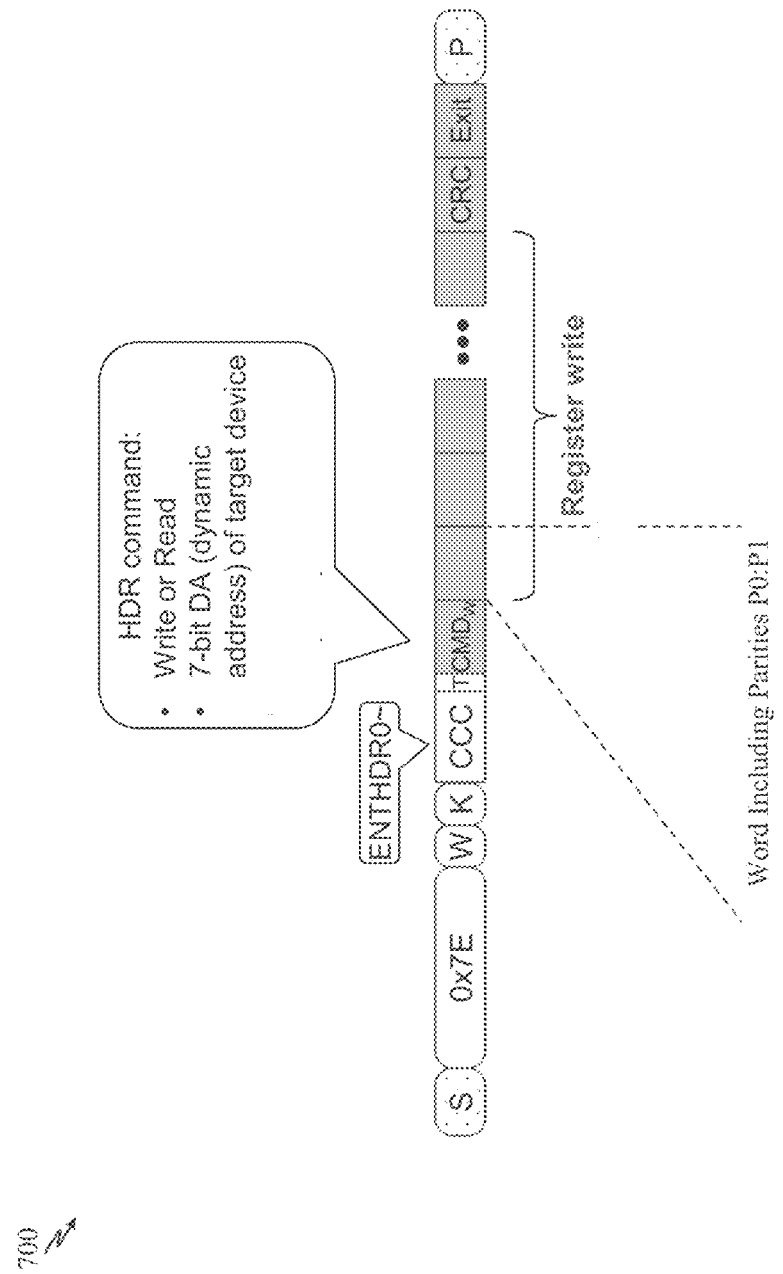
FIG. 7 illustrates an exemplary format for an I3C HDR sequence.

FIG. 7 illustrates an exemplary format for an I3C HDR sequence 700.

Exemplary Transcoding Technique for Legacy Devices

In order to implement the sleep/wakeup modes described above, a mechanism is needed that permits the legacy devices to receive either the sleep command/call and/or the wakeup command/call while the legacy device is sleeping (e.g., not operating). This may be accomplished by having a receiver device within the legacy device that is capable of receiving transmitted signals from the shared bus without then need for a receiver clock.

Figure 8:
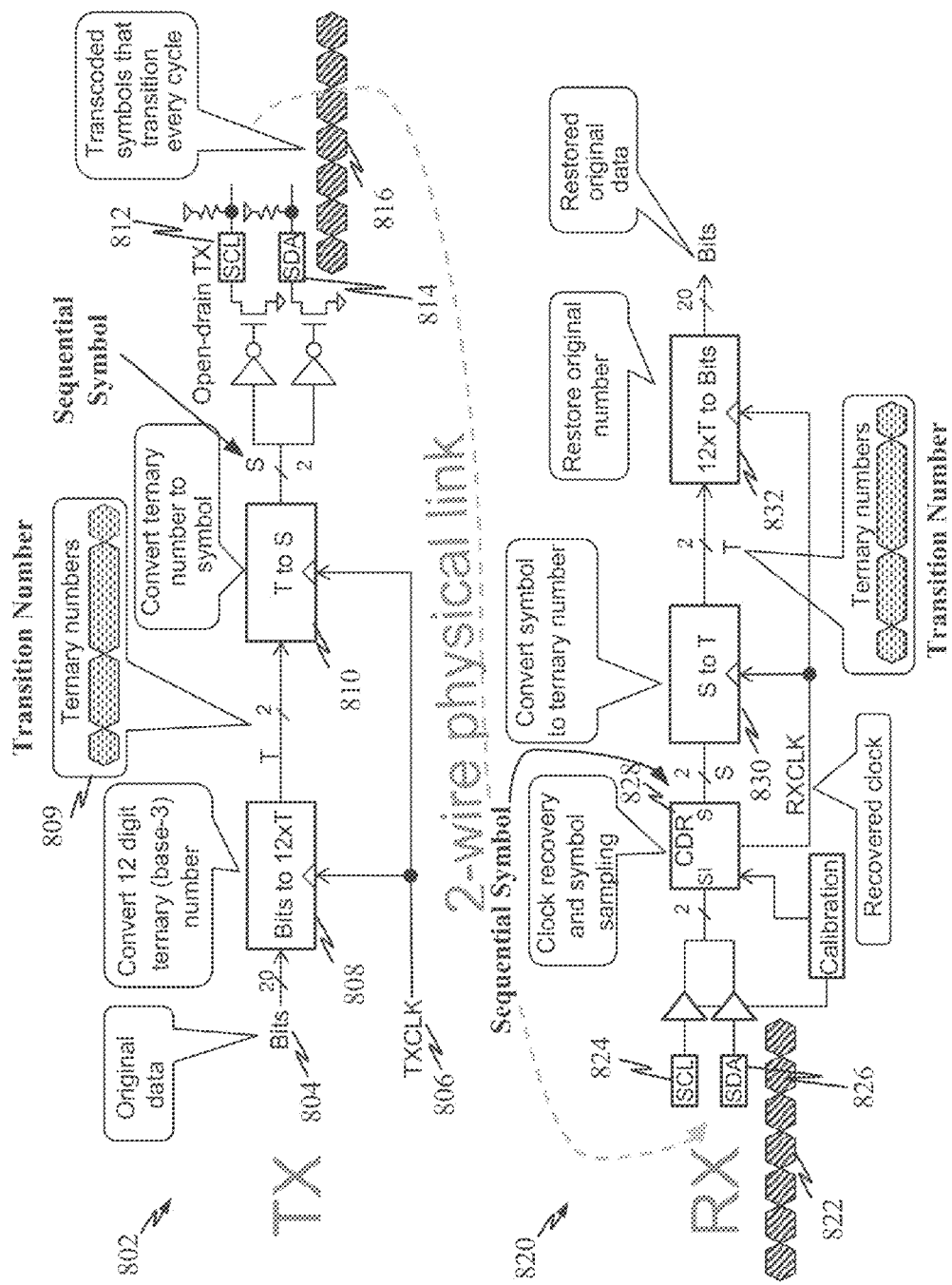
FIG. 8 is a block diagram illustrating an exemplary method for transcoding of data bits into sequential symbols at a transmitter to embed a clock signal within the sequential symbols.

FIG. 8 is a block diagram illustrating an exemplary method for transcoding of data bits into sequential symbols at a transmitter to embed a clock signal within the sequential symbols. At the transmitter 802, a sequence of data bits 804 are converted into a ternary (base 3) number (e.g., where each individual digit of the ternary number is referred to as a "transition number"), and the ternary numbers are converted into sequential symbols which are transmitted over a control data bus that includes a clock line SCL 812 and a data line SDA 814.

In one example, an original 20-bits 804 of binary data is input to a bit-to-transition number converter block 808 to be converted to a 12-digits ternary number 809. Each digit of a 12-digits ternary number may represent a "transition number". Two consecutive digits of a transition number may be the same digit value. Each digit of a transition number is converted into a sequential symbol at a transition-to-symbol block 810 such that no two consecutive sequential symbols have the same value. Because a transition (e.g., change) is guaranteed at every sequential symbol, such sequential symbol transition may serve to embed a clock signal. Each sequential symbol 816 is then sent over a two wire physical link (e.g., I2C control data bus comprising a SCL line 812 and a SDA line 814).

At a receiver 820 the process is reversed to convert the sequential symbols back to bits and, in the process, a clock signal is extracted from the sequential symbol transition. The receiver 820 receives the sequential symbols 822 over the two wire physical link (e.g., an I2C control data bus comprising a SCL line 824 and a SDA line 826). The received sequential symbols 822 are input into a clock-data recovery (CDR) block 828 to recover a clock timing and sample the sequential symbols (S). A symbol-to-transition number converter block 830 then converts each sequential symbol to a transition number, where each transition number represents a digit of a ternary number. Then, a transition number-to-bits converter 832 converts twelve (12) transition numbers (i.e., a ternary number) to restore twenty (20) bits of original data from the 12 digit ternary number.

Figure 10:
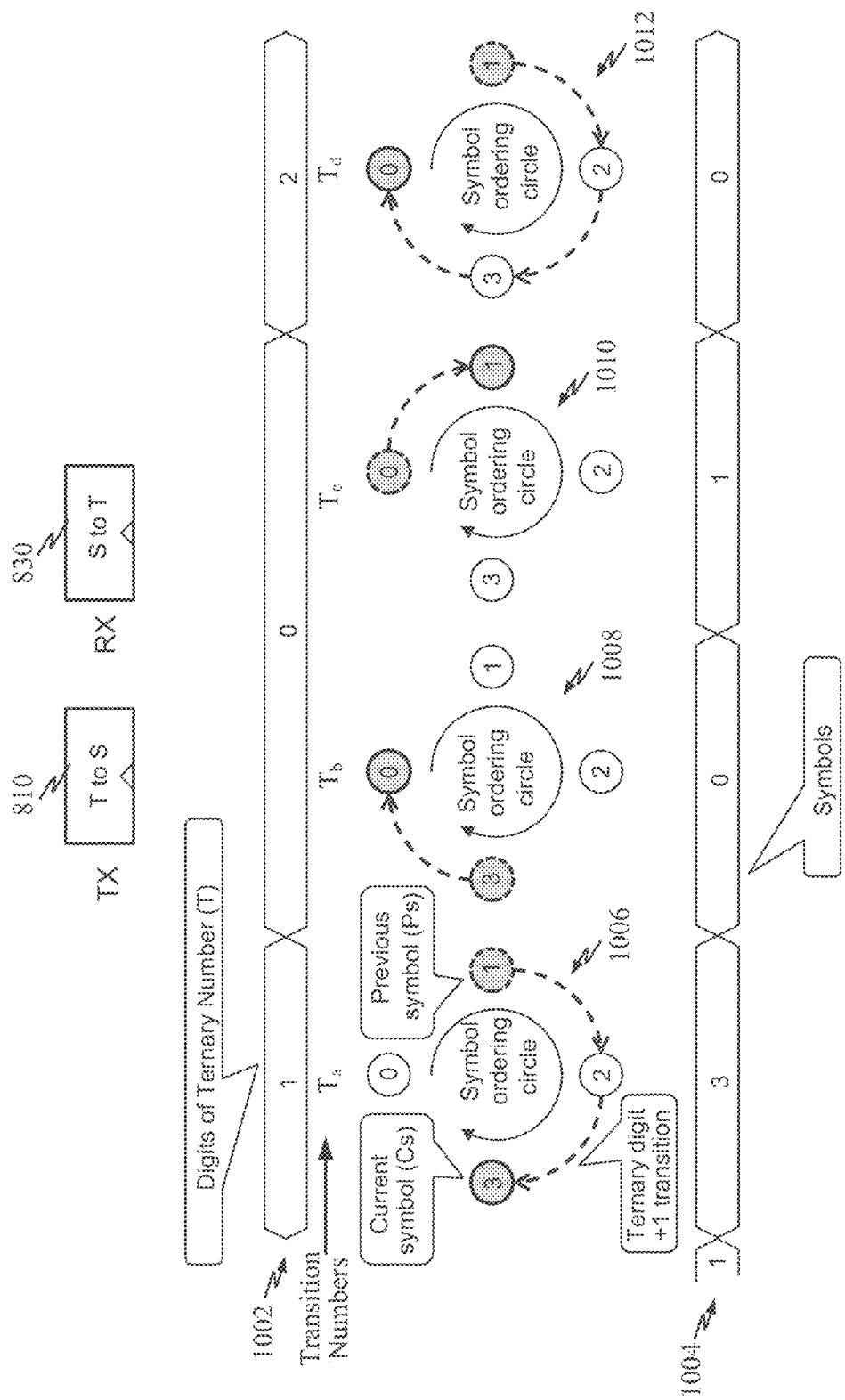
FIG. 10 illustrates an exemplary conversion between transition numbers and sequential symbols.

The technique illustrated herein may be used to increase the link rate of a control data bus 108 (FIG. 1 and FIG. 2) beyond what the I2C standard control data bus provides and is referred hereto as CCIe mode. In one example, a master node/device and/or a slave node/device coupled to the control data bus 102 may implement transmitters and/or receivers that embed a clock signal within sequential symbol changes/transitions (as illustrated in FIG. 10) in order to achieve higher bit rates over the same control data bus than is possible using a standard I2C control data bus.

Figure 9:
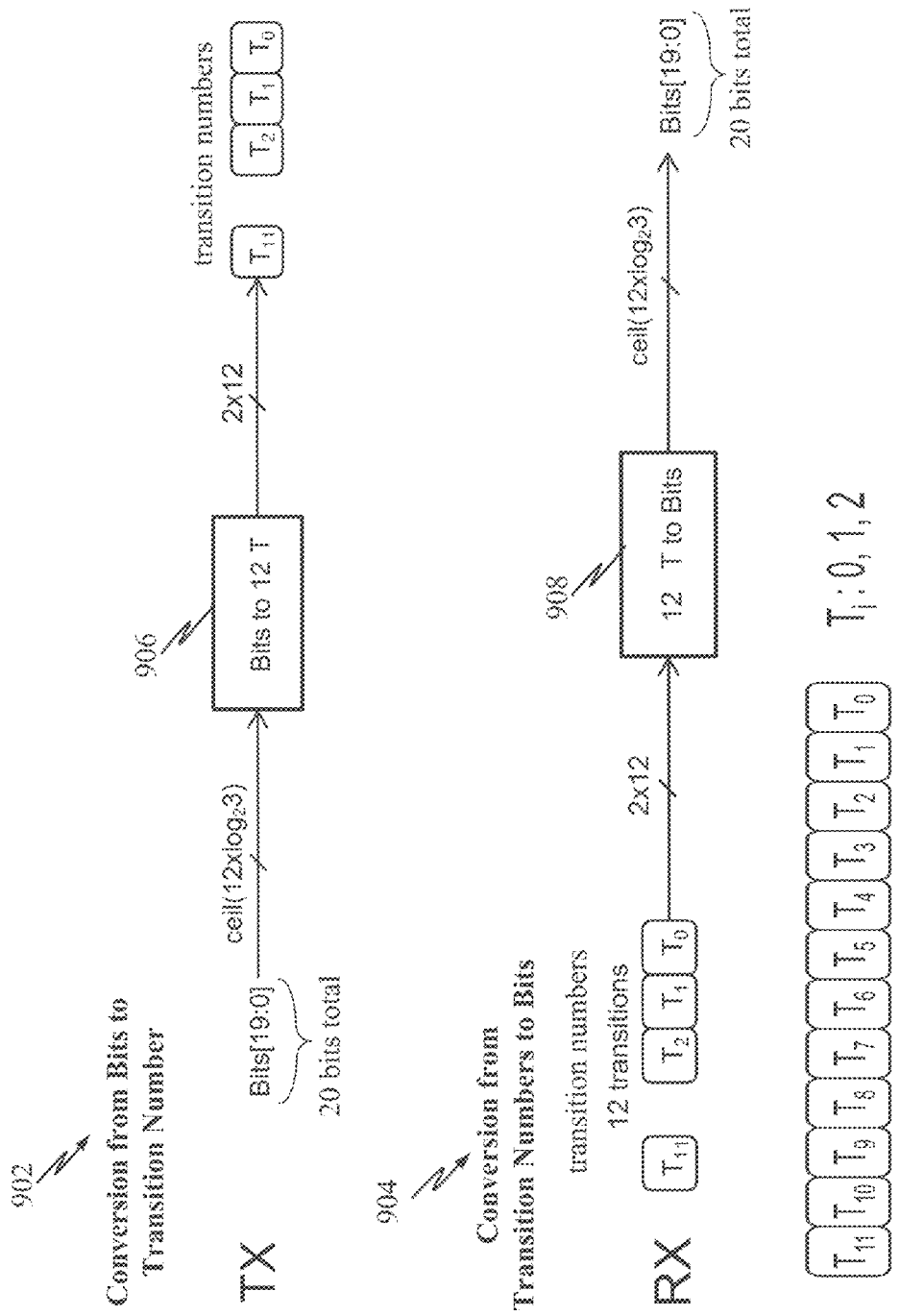
FIG. 9 illustrates an exemplary conversion from bits to transition numbers at a transmitter and then from transition numbers to bits at a receiver.

FIG. 9 illustrates an exemplary conversion from bits to transition numbers at a transmitter 902 and then from transition numbers to bits at a receiver 904. This example illustrates the transmission for a 2-wire system using 12 transition symbols. The transmitter 902 feeds binary information, Bits, into a "Bits to 12×T" converter 906 to generate 12 symbol transition numbers, T0 to T11. The receiver 904 receives 12 symbols transition numbers, T0 to T11, which are fed into a "12×T to Bits" converter 908 to retrieve the binary information (Bits). If there are r possible symbol transition states per one T, T0 to T11, 12 transitions can send $r^{12}$ different states. For a 2-wire bus, $r=2^2-1$. Consequently, transitions T0 ... T11 contain data that can have $(2^2-1)^{12}$ different states. Consequently, $r=4-1=3$ and the number of states=$(4-1)^{\wedge}12=531441$.

In this example for a 2-wire system using 12 symbol transition numbers, it may be assumed that the possible symbol transitions per one T, r is 3(=2–1). If the number of symbols in a group is 12, a 12-digit ternary number (base-3 number): T11, T10, ..., T2, T1, T0, where each Ti: 0, 1, 2, may be used. For example, for {T11, T10, ... T2, T1, T0}={2, 1, 0, 0, 1, 1, 0, 1, 0, 1, 2, 1}, the ternary number is:

$$2100\_1101\_0121_3 \text{(Ternary number)} =$$
$$2 \times 3^{11} + 1 \times 3^{10} + 0 \times 3^9 + 0 \times 3^8 + 1 \times 3^7 + 1 \times 3^6 + 0 \times 3^5 +$$
$$1 \times 3^4 + 0 \times 3^3 + 1 \times 3^2 + 2 \times 3^1 + 1 \times 3^0 = 416356 (0x65A64).$$

In this manner, 12 transitions numbers may be converted into a number. Note that the ternary number $2100\_1101\_0121_3$ may be used as the transition number, for example, in FIG. 9, so that each integer may be mapped to a sequential symbol and vice versa. When sending $2100\_1101\_0121_3$ in inverse order, the Ts are sent in decreasing order of power, i.e., T11 is the digit to be multiplied by $3^{11}$ so it is of the eleventh power and so forth.

The example illustrated in FIG. 9 for a 2-wire system and 12 symbol transition numbers may be generalized to an n-wire system and m symbol transition numbers. If there are r possible symbol transition states per one T, T0 to Tm−1, m transitions can send $r^m$ different states, i.e., $r=2^n-1$. Consequently, transitions T0 . . . Tm−1 contain data that can have $(2^n-1)^m$ different states.

FIG. 10 illustrates an exemplary conversion between transition numbers 1002 and sequential symbols 1004. An individual digit of ternary number, base-3 number, also referred to as a transition number, can have one of the three (3) possible digits or states, 0, 1, or 2. While the same digit may appear in two consecutive digits of the ternary number, no two consecutive sequential symbols have the same value. The conversion between a transition number and a sequential symbol guarantees that the sequential symbol always changes (from sequential symbol to sequential symbol) even if consecutive transition numbers are the same.

In one example, the conversion function adds the transition number (e.g., digit of a ternary number) plus 1 to the previous raw sequential symbol value. If the addition results in a number larger than 3, it rolls over from 0, then the result becomes the state number or value for the current sequential symbol.

In a first cycle 1006, a previous sequential symbol (Ps) is 1 when a first transition number ($T_a$) 1 is input, so the first transition number 1 plus 1 is added to the previous sequential symbol (Ps), and the resulting current sequential symbol (Cs) of 3 becomes the current sequential symbol that is sent to the physical link.

In a second (next) cycle 1008, a second transition number ($T_b$) of 0 is input, and the second transition number 0 plus 1 is added to the previous sequential symbol (Ps) of 3. Since the result of the addition (0+1+3) equals 4, is larger than 3, the rolled over number 0 becomes the current sequential symbol (Cs).

In a third cycle 1010, a third transition number ($T_c$) of 0 is input. The conversion logic adds the third transition number 0 plus 1 to the previous sequential symbol (Ps) 0 to generate current sequential symbol (Cs) 1.

In a fourth cycle 1012, a fourth transition number ($T_d$) of 2 is input. The conversion logic adds the fourth transition number ($T_d$) 2 plus 1 to the previous symbol (Ps) 1 to generate current sequential symbol (Cs) 0 (since the result of the addition, 4, is larger than 3, the rolled over number 0 becomes the current sequential symbol).

Consequently, even if two consecutive ternary digits $T_b$ and $T_c$ have the same number, this conversion guarantees that two consecutive sequential symbols have different state values. Because of this conversion, the guaranteed sequential symbol change or transition in the sequence of symbols 1004 may serve to embed a clock signal, thereby freeing the clock line SCL in an I2C control data bus for data transmissions.

Note that while this example of transition number to sequential number conversions adds a guaranteed number "1" to increment between consecutive sequential symbols, other values may be used in other implementations to guarantee a transition or change between sequential symbols.

Figure 11:
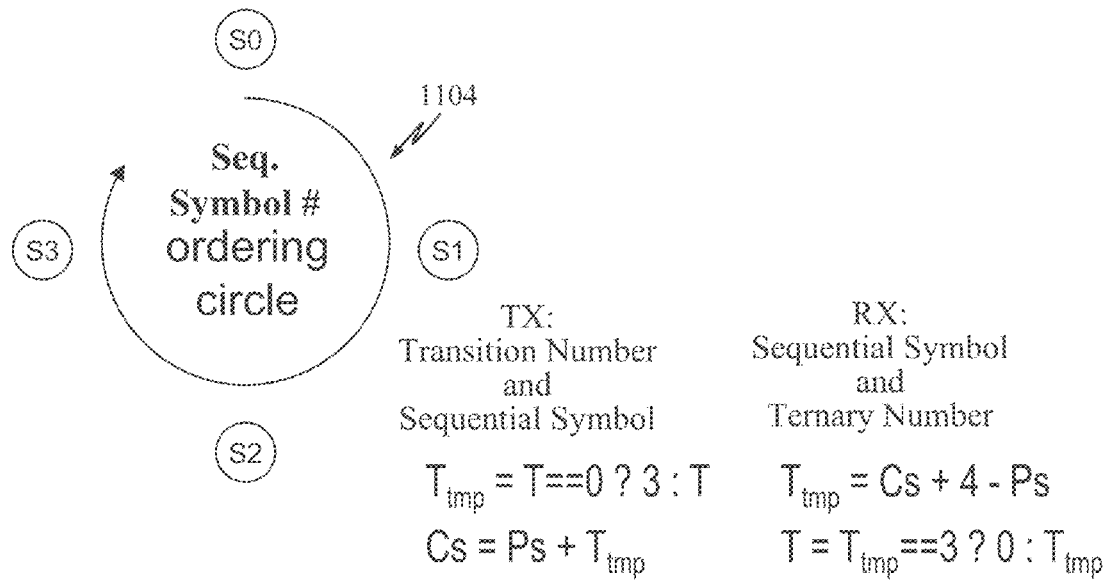
FIG. 11 illustrates the conversion between sequential symbols and transition numbers.

FIG. 11 illustrates the conversion between sequential symbols and transition numbers. This conversion maps each transition from a previous sequential symbol number (Ps) to a current sequential symbol (Cs) to a transition number (T).

At the transmitter device, the transition numbers are being converted to sequential symbols. Because of the relative conversion scheme being used, the transition numbers guarantee that no two consecutive sequential symbols 1104 will be the same.

In one example for a 2-wire system, there are 4 raw symbols assigned to 4 sequential symbol S0, S1, S2, and S3. For the 4 sequential symbols, Table 1102 illustrates how a current sequential symbol (Cs) may be assigned based on a previous sequential symbol (Ps) and a temporary transition number $T_{tmp}$ based upon the current transition number (T).

In this example, the transition number $C_s$ may be assigned according to:

$$Cs=Ps+T_{tmp}$$

where $T_{tmp}$=T==0?3:T. Alternatively stated, if the current transition number T is equal to zero, the temporary transition number $T_{tmp}$ becomes 3, else $T_{tmp}$ becomes equal to T. And once $T_{tmp}$ is calculated, Cs is set to Ps plus $T_{tmp}$. Moreover, on the receiver end, the logic is reversed to recover T, $T_{tmp}=C_s+4-P_s$ and T=$T_{tmp}$==3?0:$T_{tmp}$.

FIG. 12 illustrates a general example of converting a ternary number (base-3 number) to a binary number, where each T in {T11, T10, . . . T2, T1, T0} is a symbol transition number.

FIG. 13 illustrates an exemplary method for converting a binary number (bits) to a 12 digit ternary number (base-3 number). Each digit can be calculated by dividing the remainder (result of a modulo operation) from a higher digit calculation with 3 to the power of the digit number, discarding decimal points numbers.

FIG. 14 illustrates an example of one possible implementation of the division and the module operations of the FIG. 13, which may be synthesizable by any commercial synthesis tools.

Exemplary 8-Bit Size Operation Indicator Using Bit 19

It is observed that in converting an n-bit (binary) number to a k-digit odd numerical base number (e.g., ternary, quinary, septenary, nonary, etc.), the available numerical space represented by the k-digit odd numerical base number may exceed the numerical space needed to represent the n-bit number. Consequently, this unused numerical space within the k-digit odd numerical base number may be utilized to encode other information.

Figure 15:
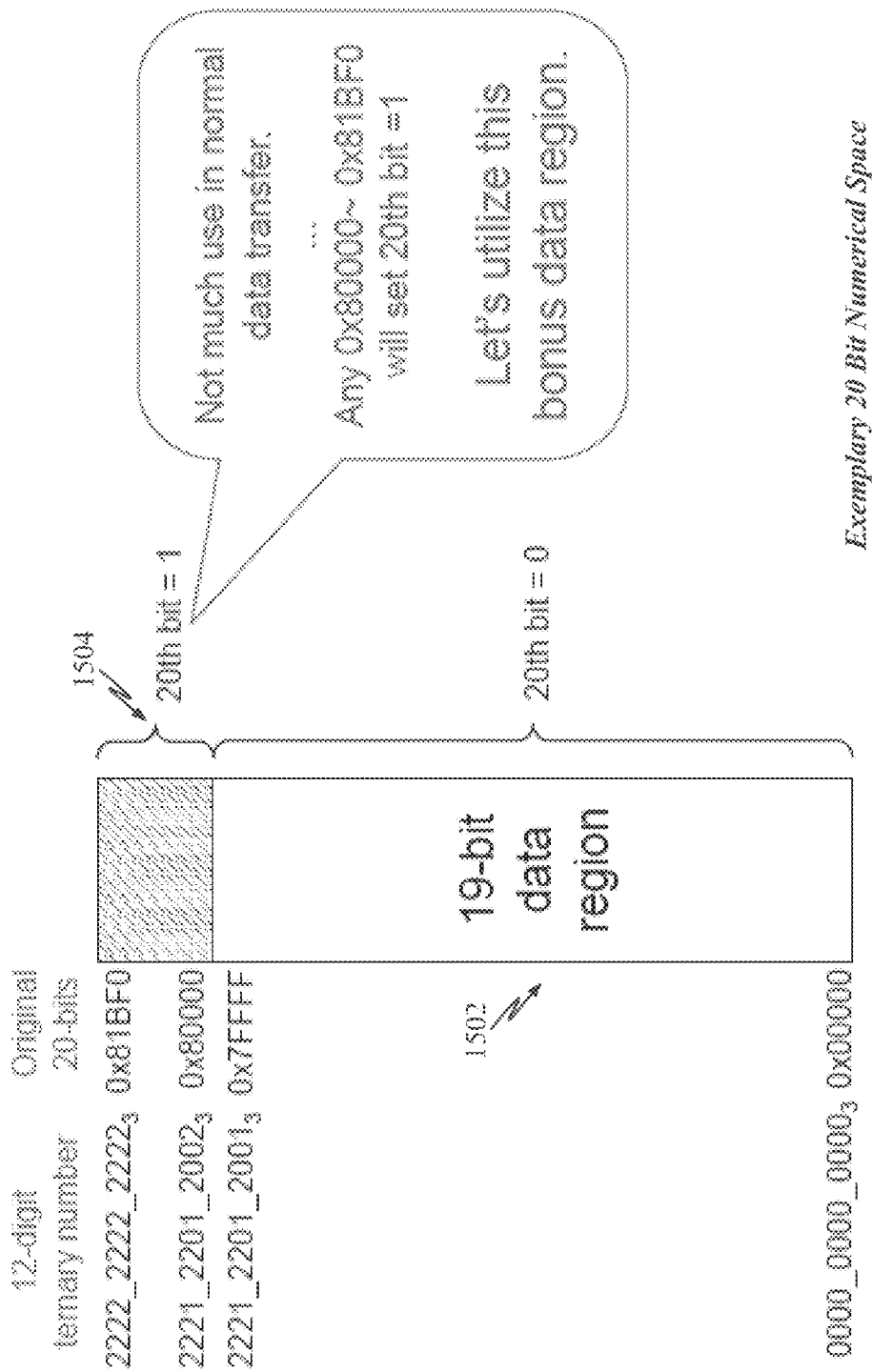
FIG. 15 illustrates an exemplary number space representing 20 bits of information or a 12 digit ternary number.

FIG. 15 illustrates an exemplary number space representing 20 bits of information or a 12 digit ternary number. In this example, 19-bit data 1502 (i.e., bits 0 to bit 18) may wish to be transcoded into a ternary number, which requires a 12-digit ternary number. As illustrated, the 19-bit numerical space, 0x0000 hex-0x7FFFF hex, may be transcoded into $0000\_0000\_0000_3$ to $2221\_2201\_2001_3$ in the ternary numerical space. However, such transcoding of 19 bits does not use the full numerical space of 12-digit ternary number.

For instance, in the exemplary number space illustrated in FIG. 15, a 12-digit ternary number (e.g., illustrated in FIGS. 8, 9, 12, 13, and 14) is capable of encoding approximately 19.02 bits of information. While a primary protocol may utilize 19 bits for encoding data, 0.02 bits of information are still available in the 12-digit ternary number space. In the example of FIG. 15, the ternary number space $2221\_2201\_2002_3$ to $2222\_2222\_2222_3$ remains unused, which corresponds to 0x80000 hex to 0x81BF0 hex in a 20 bit (binary) number space.

As a result of the transcoding between the 20-bit binary number and 12-digit ternary number, this excess/residual ternary numerical space/region 1504 may be available to encode or transmit other/additional information. In order to encode information in this excess/residual ternary numerical space 1504 (in the ternary number space), an extra bit may be added to the binary number space. Such extra bit may be used to represent only the excess/residual ternary numerical space 1504, which may be only a portion of the full numerical range available when the $20^{th}$ bit is added (i.e., $20^{th}$ bit is set to "1"). For instance, in FIG. 15 the bits 0-18 are represented within the 12-digit ternary number range of $0000\_0000\_0000_3$ to $2221\_2201\_2001_3$. The excess/residual ternary numerical region/space 1504 is $2221\_2201\_2002_3$ to $2222\_2222\_2222_3$. The $20^{th}$ bit, in the binary space, is used to represent $2221\_2201\_2002_3$ to $2222\_2222\_2222_3$ (e.g., 0x80000 hex to 0x81BF0 hex) within the 12-digit ternary number. Note that, so long as the $20^{th}$ bit is only used to only represent numbers within the excess/residual ternary numerical space 1504, no additional digits are needed in the 12-digit ternary number to accommodate the $20^{th}$ bit.

As is typical in the computer sciences, counting bitwise begins at zero (i.e., bit 0), and the $20^{th}$ bit is often referred to as "bit 19". As used herein, "Bit19" may refer to the use of the $20^{th}$ bit to represent the excess/residual ternary numerical space/region 1504, not the full numerical space possible by using the $20^{th}$ bit (i.e., bit 19 set to "1").

FIG. 16 illustrates an exemplary mapping for the excess/residual ternary numerical space 1504 in FIG. 15. In this example, the $20^{th}$ bit (i.e., bit 19) is set to "1" in order to encode additional information within the excess/residual ternary numerical space/region 1504. As illustrated in this mapping, various bits may be set to indicate a master handover, a slave-to-slave request and grant, a master bus request, etc. In this example, various contiguous number spaces may be defined by using the $20^{th}$ bit (i.e., bit 19) and 9 other bits (e.g., bits that would otherwise be used read, write, and/or address information within bits 0-18). For instance, a binary number region/span having 512 states may be defined within the numerical region 0x81800 hex-0x819FF hex.

FIG. 17 illustrates an exemplary mapping for the excess/residual ternary numerical space 1602 in FIG. 16.

By accessing an otherwise unused numerical space in the ternary number space (e.g., the Bit19 region), additional information (e.g., protocol commands, and overlay protocol, etc.) may be encoded for transmission between devices.

Figure 18:
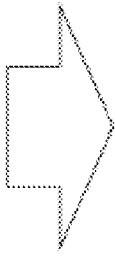
FIG. 18 illustrates how a high byte and/or low byte may be accessed by using or reusing a number within the bit 19 region.

FIG. 18 illustrates an exemplary mapping for how a high byte and/or low byte may be separately accessed for byte-size access defined within the excess/residual ternary numerical space/region 1504. For instance, within the binary number region/span 0x81800-0x819FF (1802), 512 states may be split into two (2) regions of 256 states each (or 8-bits). In this example, two binary number regions/spans 0x81800-0x818FF (1804) and 0x81900-0x819FF (1806) may be used/reused to indicate whether 8-bit size operations (i.e., one byte or byte-size) are being enabled. Note that other binary number regions/spans may be selected in alternative implementations.

In one example, when an 8-bit (byte-size) operation is desired using a low byte (e.g., from the 16-bit HDR word in FIG. 4), a low-byte enable may be indicated by setting bit 19 to "1" (or High) and bit 8 to "0" (or Low) so the binary value of the 20 bit segment is within region/span 0x81800-0x818FF. Similarly, when an 8-bit operation is desired using a high byte (e.g., from the 16-bit HDR word in FIG. 4), a high-byte enable may be indicated by setting bit 19 to "1" (or High) and bit 8 to "1" (or High) so the binary value of the 20 bit segment is within region/span 0x81900-0x819FF.

In this manner, whenever a device (e.g., a sensor or processor) wishes to indicate 8 bit operation (i.e., byte-size operation), it may do so by taking advantage of the excess/residual ternary numerical space created by the transcoding technique discussed in FIGS. 8-14 to encode the 8-bit operation indicator (e.g., high byte or low byte indicators). In some cases, the region/span selected to indicate 8 bit operation may be repurposed from other commands/indicators that utilize the bit 19 region.

Referring again to FIG. 18, a binary number 0x8 1BBA has been defined as a filler data word, which is ignored by a receiving device (i.e., receiving device knows to ignore such filler data word). That is, the sequence of bits used in the filler word 1808 effectively disables the use of both high and low bytes.

Note that while some examples discussed and illustrated herein may refer to 8-bit (byte-size) access in a system supporting a minimum 16-bit access, it is contemplated herein that a similar method may be implemented to access w-bit data words in a system supporting only y-bit data word access (where w and y are positive integers). For instance, this method may be used to facilitate 4-bit access (i.e., a nibble) in systems supporting 8-bit, 16-bit, or 32 bit access.

Exemplary Underflow and Overflow Prevention

When image data is retrieved from always-on image sensors, there is the potential for buffer underflow (i.e., read operation when buffer is empty) or buffer overflow at the image sensor depending on the transfer rate used by the retrieving/receiving device (e.g., master device in FIG. 1). For instance, if the retrieving/receiving device retrieves data from the image sensor buffer at a faster rate than such data is stored in the image sensor buffer, this will eventually cause the buffer to become empty, triggering an underflow condition. Similarly, the retrieving/receiving device retrieves/reads data from the image sensor buffer at a slower rate than such data is stored in the image sensor buffer, this will eventually cause the buffer to become full, triggering an overflow condition. To prevent such conditions from occurring, a way to indicate such condition to a retrieving/receiving device is needed.

When a read operation occurs, to address an underflow condition (or potential underflow condition or buffer empty condition), the image sensor may simply add a "filler" to its buffer whenever it becomes empty or is nearly empty (i.e., below a threshold). Alternative, instead of adding the filler data to the transmission buffer, such filler data (e.g., or equivalent transcoded symbols) may be multiplexed or otherwise inserted directly into an output channel or bus. As illustrated in FIG. 18, the binary number 0x81BBA is defined as a filler and may be used by the image sensor to avoid an underflow condition.

To address an overflow condition, the image sensor may provide an over threshold indicator.

Figure 19:
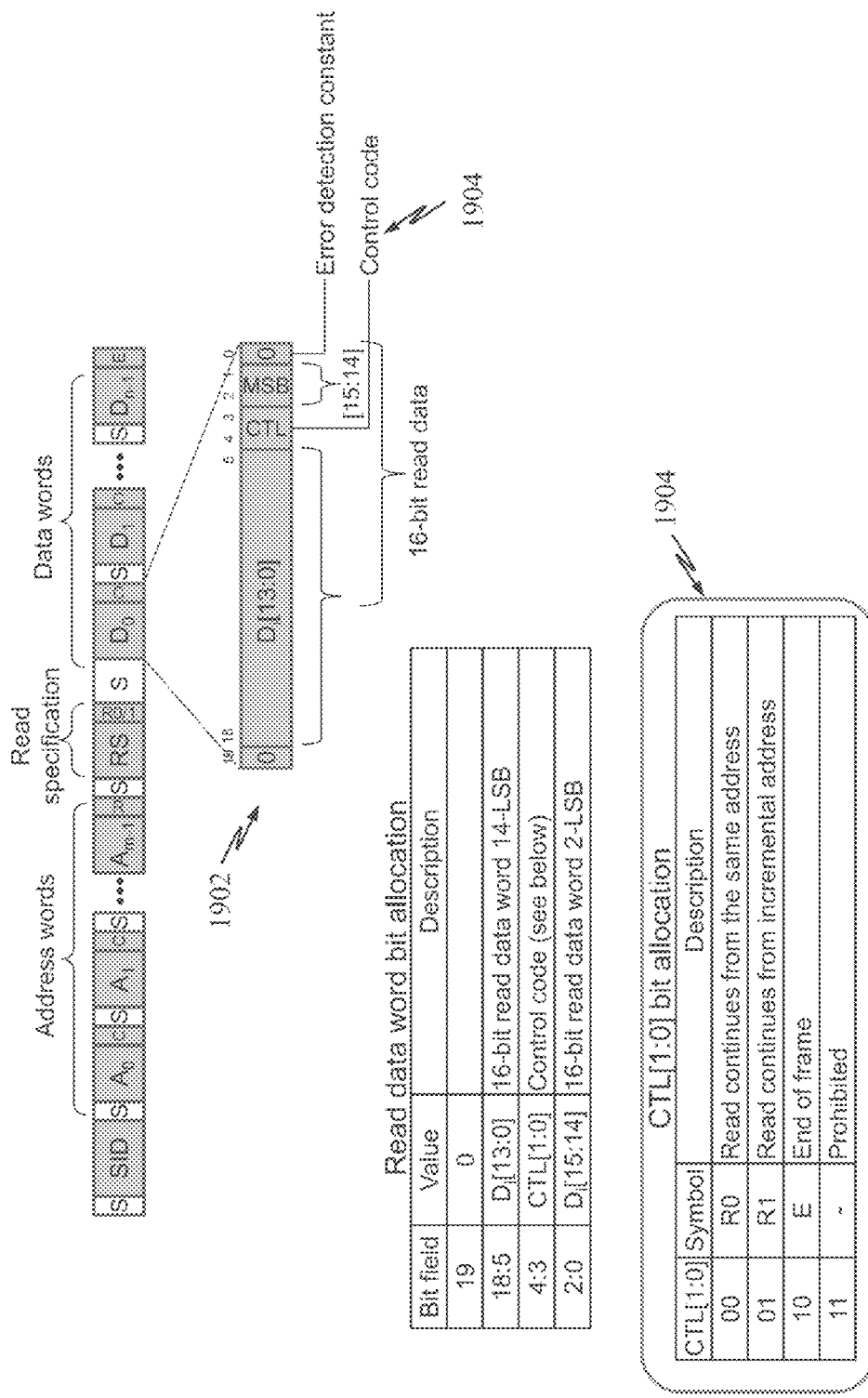
FIG. 19 illustrates an exemplary read data word format which includes a 20 bit data segment.

FIG. 19 illustrates an exemplary read data word format which includes a 20 bit data segment 1902. In this example, two bits are used for a control code CTL [1:0] 1904 for the word 1902, and the control code has predefined values indicative of four states.

Figure 20:
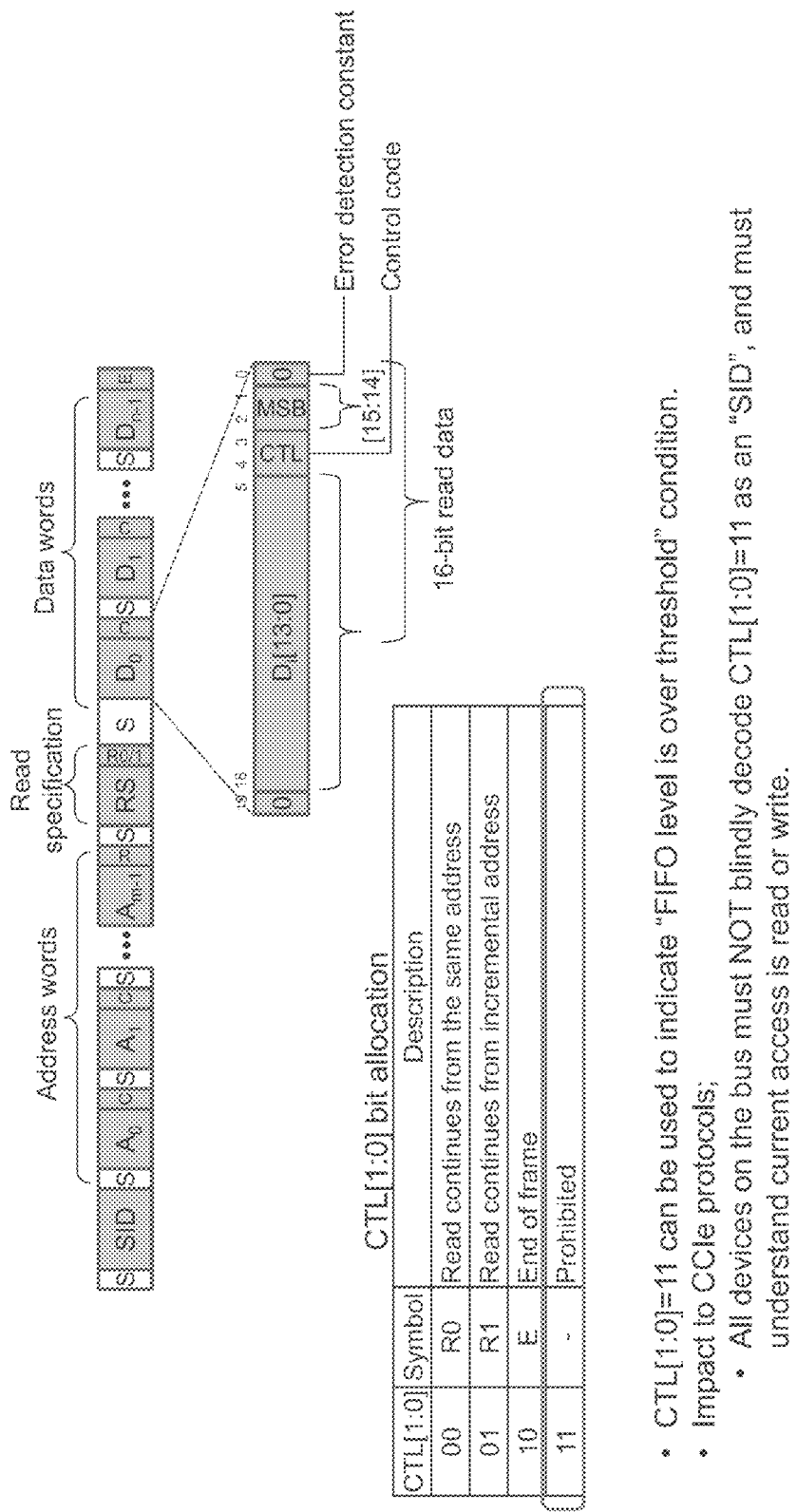
FIG. 20 illustrates a first example for providing an over threshold indicator condition.

FIG. 20 illustrates a first example for providing an over threshold indicator condition. In this approach, the control code may be used to indicate an over threshold condition (i.e., potential overflow condition where transmission buffer is becoming full) by using a previously unused/prohibited control code value CTL[1:0]=11. Whenever a retrieving/receiving device receives such control code CTL [1:0]=11 in the context of a read or write operation, it should interpret it as an over threshold condition and increase its data retrieval rate from the affected sensor to reduce or eliminate the over threshold condition.

This mechanism may serve to avoid a buffer overflow condition at the image sensor. Initially, when the image sensor issues an interrupt to the master device over the single-ended control data bus, the transmission buffer has image pixel data available. If the receiving/retrieving device (e.g., master device) retrieves the pixel data from the image sensor transmission buffer at a slower rate than the pixel data is written to the transmission buffer by the image sensor, then pixel data will accumulate in the transmission buffer. At some point, buffer may fill-up with pixel data up to or above a buffer threshold level. Such buffer threshold may be set lower than the transmission buffer size.

When the transmission buffer gets filled to a threshold level, then the over threshold indicator is triggered. This indicator serves to inform the receiving/retrieving device that it needs to boost its image/pixel data retrieval rate from the image sensor. The receiving/retrieving device may then boost its image/pixel data retrieval/read rate from the image sensor until the transmission buffer level is reduced below the threshold level or below a second (lower) threshold level. At that point, once the image sensor may stop providing the over threshold indicator. In this manner, buffer overflow may be prevented.

Figure 21:
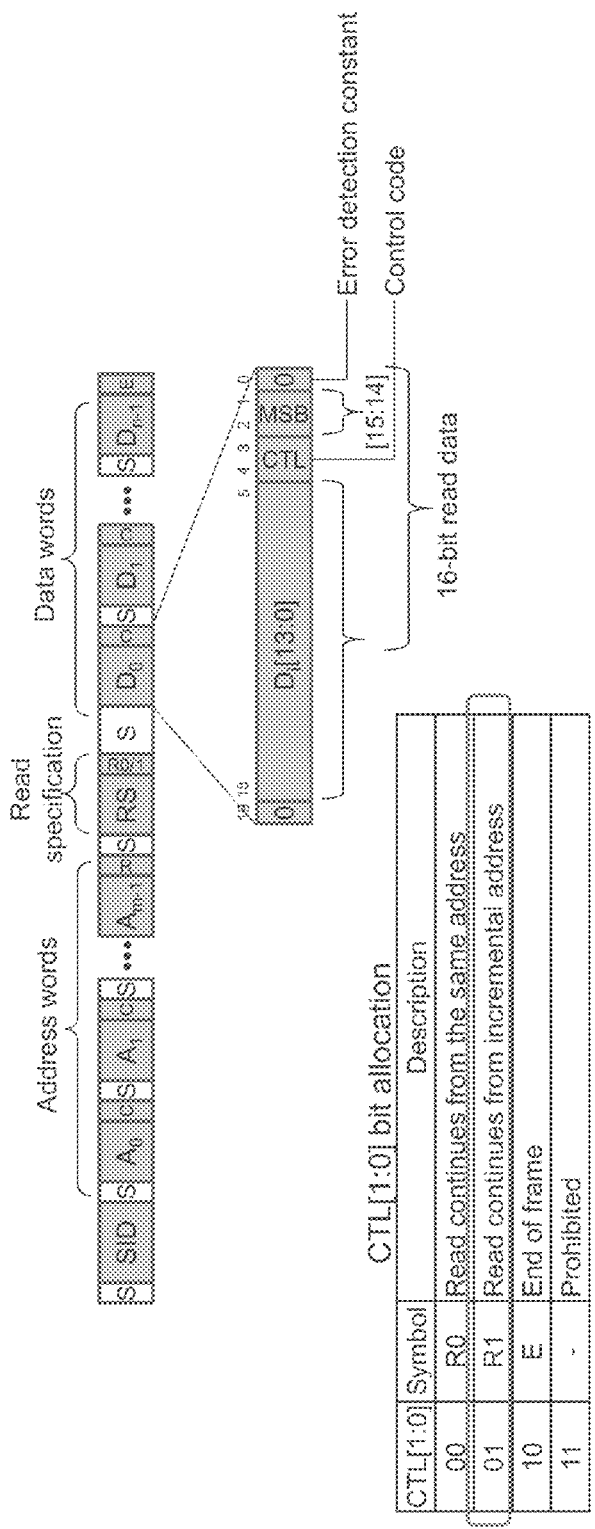
FIG. 21 illustrates a second example for providing an over threshold indicator condition.

FIG. 21 illustrates a second example for providing an over threshold indicator condition. In this approach, the control code may be used to indicate an over threshold condition by using a control code CTL [1:0]=01 (Read continues from incremental address) that would never occur for a particular retrieval operation. For instance, in retrieving data from a sensor, multiple words are read from the same address, so the control code CTL [1:0]=00 is expected. But if the control code CTL [1:0]=01 is received instead, then this condition may be interpreted as an over threshold indicator. Whenever a retrieving/receiving device receives such control code CTL [1:0]=01 in the context of a read operation, it should interpret is as an over threshold condition and increase its data retrieval rate from the affected sensor to avoid the possibility of a buffer overflow.

Figure 22:
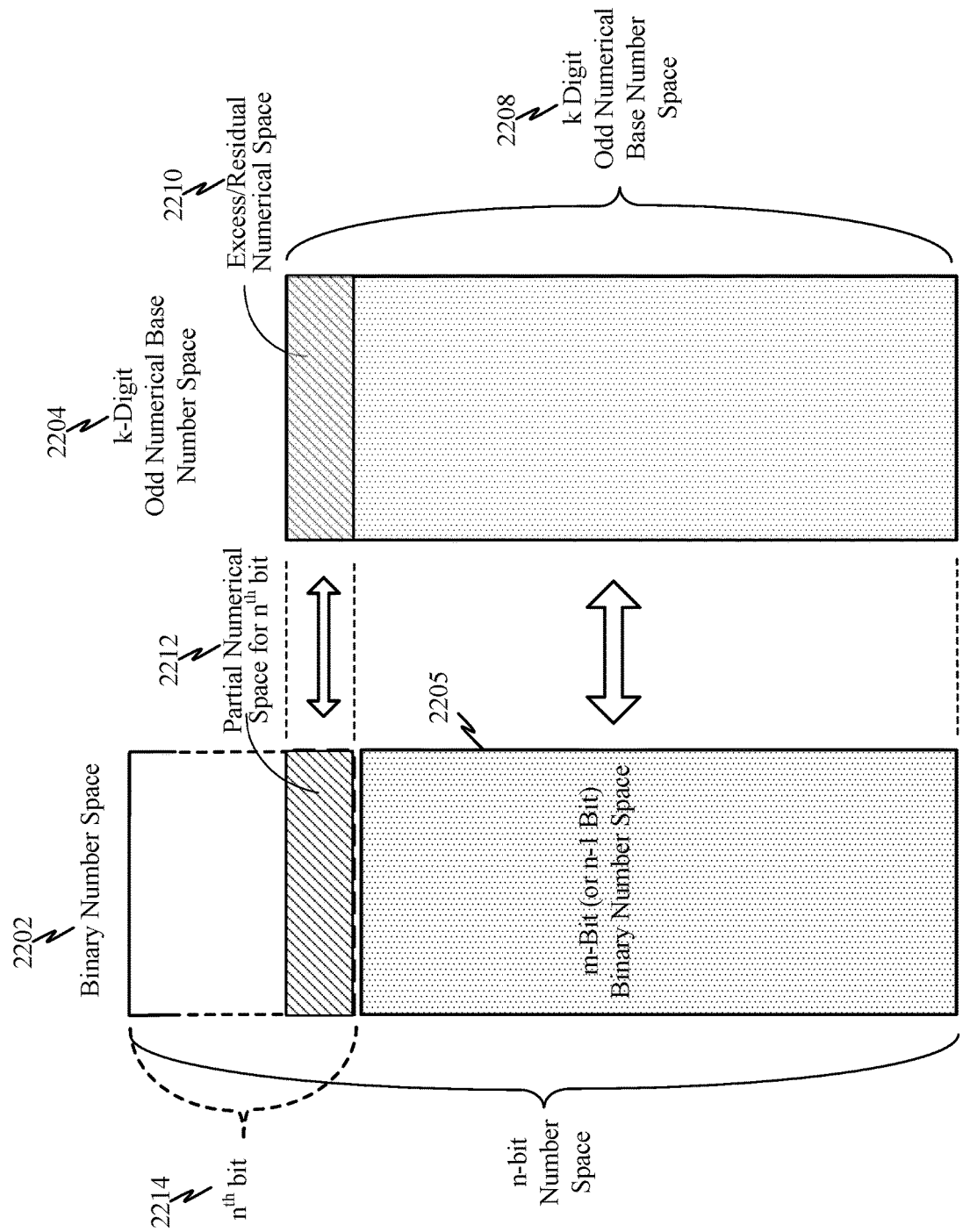
FIG. 22 illustrates an exemplary transcoding between a binary number space and an odd numerical base number space.

Exemplary Method and Device to Encode/Decode Information Within a Transcoded Excess/Residual Number Space FIG. 22 illustrates an exemplary transcoding between a binary number space 2202 and an odd numerical base number space 2204. For instance, an m-bit (binary) number space 2205 may be converted to a k-digit odd numerical base number (e.g., ternary, quinary, septenary, nonary, etc.) within the odd numerical base number space 2204. The available numerical space 2208 represented by the k-digit odd numerical base number may exceed the numerical space needed to represent the m-bit number space 2205. Consequently, this unused/excess/residual numerical space 2210 within the k-digit odd numerical base number may be utilized to encode other information (e.g., an overlay protocol, a control protocol, extended protocol, etc.) without incurring any additional digits in the odd numerical base number. To do this, an additional bit, i.e., nth bit 2214, may be added to the m-bit number space 2205 (where n=m+1). However, the nth bit 2214 may be restricted to represent a partial binary number space 2212 within the nth bit number space. This partial binary number space 2212 corresponds to the excess/residual number space 2210. This permits using the same k-digit odd numerical base number without the need to add any more digits to the k-digit odd numerical base number space 2208.

For example, in FIG. 15, the transcoding of a 19-bit binary number into a 12-digit ternary number leaves an excess/residual ternary numerical region/unused 1504 unused and available to encode other information.

Figure 23:
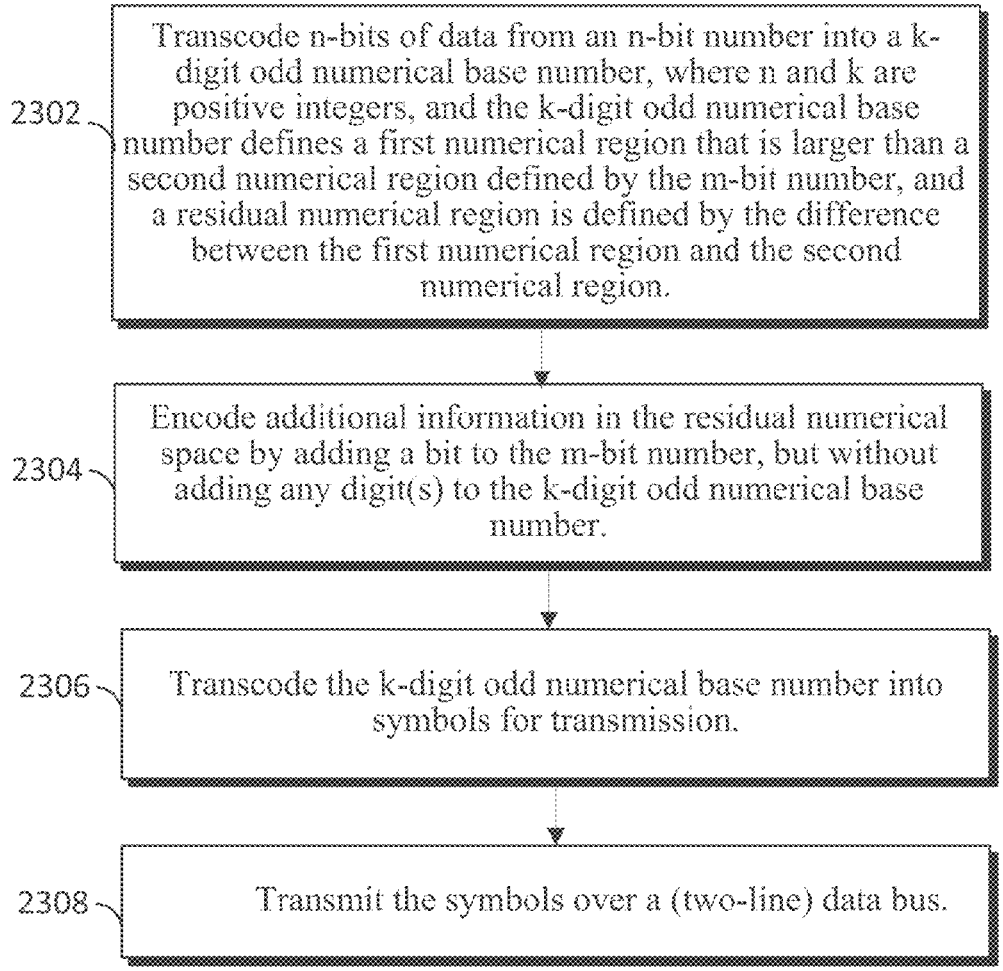
FIG. 23 illustrates an exemplary method for encoding additional information within an unused transcoded numerical space without adding unnecessary digits to the transcoded numerical space.

FIG. 23 illustrates an exemplary method for encoding additional information within an unused transcoded numerical space without adding unnecessary digits to the transcoded numerical space. In this example, m-bits of data may be transcoded (converted) from an m-bit number into a k-digit odd numerical base number, where m and k are positive integers, and the k-digit odd numerical base number defines a first numerical region (e.g., region 0x00000 hex to 0x81BF0 hex in FIG. 15) that is larger than a second numerical region (e.g., region 0x00000 hex to 07FFFF hex in FIG. 15) defined by the m-bit number, and the n-bit number is limited to an excess/residual numerical region (e.g., region 0x80000 to 0x81BF0 hex in FIG. 15) defined by a number space/region by which the first numerical region exceeds the second numerical region 2302. For instance, in the example of FIG. 15, such excess/residual numerical region is from 0x80000 hex to 0x81BF0 hex (region 1504).

In the excess/residual numerical space, additional information (e.g., for the first protocol, an extension protocol, a second/distinct protocol, etc.) may be encoded by adding/appending a most significant bit to the m-bit number (e.g., resulting in a m+1 bit number), but without adding any digit(s) to the k-digit odd numerical base number 2304. That is, for an n-bit number, where n=m+1, when the nth bit (most significant bit) is "0", the lower m bits may serve to encode data words and possibly parity information. Otherwise, when the nth bit (most significant bit) is "1" this may serve to encode the additional information in combination with a subset of other bits within the n-bit number.

Note that the nth bit (in combination with a subset of the other bits with the n-bit number) may be restricted to represent numbers in the excess/residual numerical space. This permits using the same k-digit odd numerical base number.

In one example, the m-bits of data may include read/write data words, an address, commands, etc., according to a first protocol. The additional bit may be appended to the m-bits of data as a most significant bit. In combination with at least a subset of bits from the m-bits of data, the additional bit (e.g., appended as a most significant bit) may serve to encode additional information (e.g., within the excess/residual numerical space), such as an extension of the first protocol (e.g., serving to add commands, data, etc., to the first protocol used within the m-bits of data), an overlay protocol (e.g., serving to add instructions, commands, control, data, etc., distinct and independent from the first protocol), and/or a control protocol (e.g., serving to provide controls over the m-bits of data). For instance, the m-bit number may be a 19-bit number and, once the additional bit is appended, it has a total of 20 bits. The k-digit odd numerical base number may be, for instance, a 12 digit ternary number. One example of the transcoding is illustrated n FIGS. 8-21. In an illustrative example, when the first m-bits of data are being used for the first protocol, the $n^{th}$ bit may be set to zero (0). When the $n^{th}$ bit is set to one (1), then part of the bits in within the m-bit number region may be repurposed for the second protocol (e.g., overlay, control, extension protocol). That is, when the $n^{th}$ bit is set to one (1), the first protocol may be partially or fully inoperative for that particular data word.

The k-digit odd numerical base number may then be transcoded (e.g., converted) into symbols for transmission 2306. The symbols may then be transmitted over a (two-line) data bus 2308.

In one example, the nth bit (most significant bit) appended to the m-bits of data, in combination with a subset of other bits within the m-bits of data, may serve to provide a w-bit enable indicator for enabling w-bit data words (e.g., 2-bit, 4-bit, 8-bit, etc.) in a system that only supports larger (and/or possibly smaller) y-bit data words (e.g., 16-bit data words, 32-bit data words, etc.) (where w and y are different positive integers).

Figure 24:
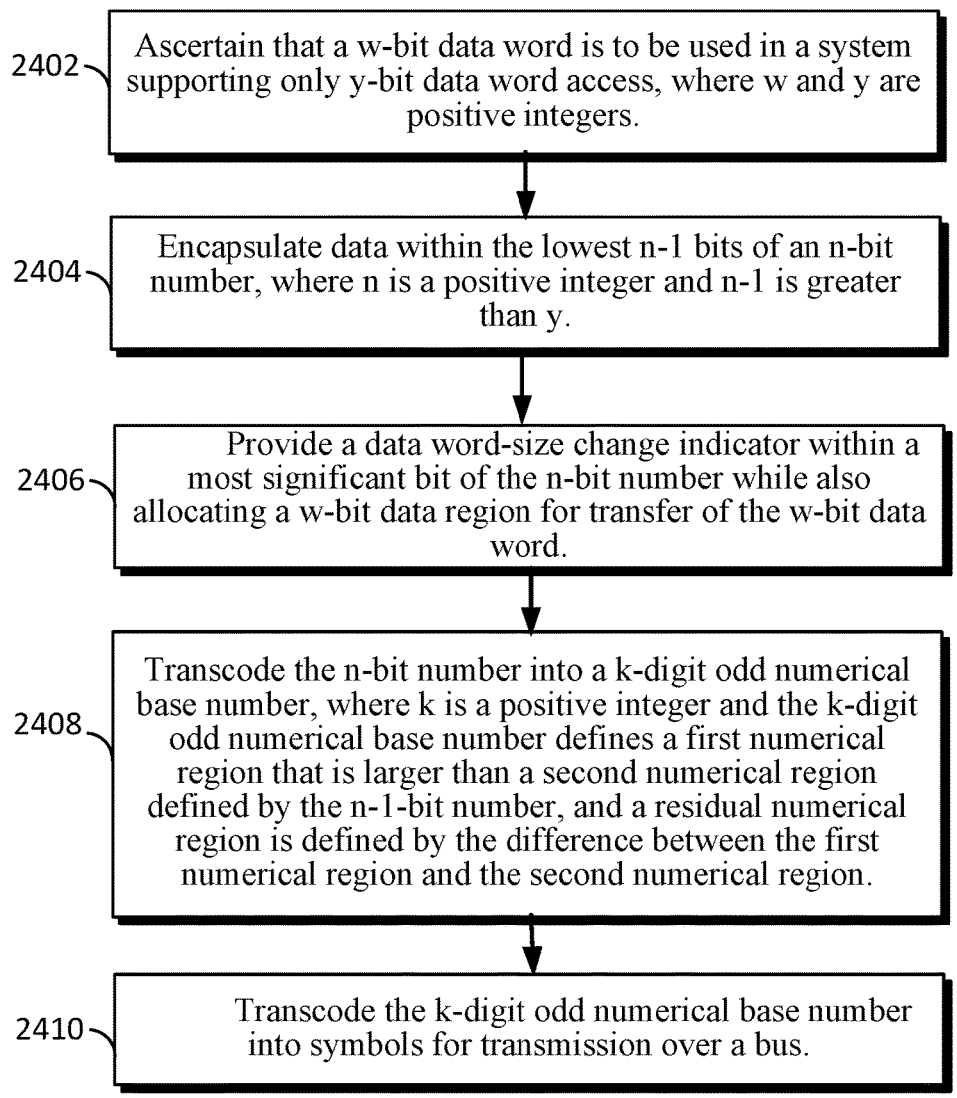
FIG. 24 illustrates an exemplary method for enabling w-bit data word access over a protocol limited to y-bit data word access.

FIG. 24 illustrates an exemplary method for enabling w-bit data word access over a protocol limited to y-bit data word access. Such enablement of w-bit data words within the protocol limited to y-bit data word access may be enabled by an extension or overlay protocol which may serve to provide such w-bit data access indicator and the w-bit data word.

Initially, it may be ascertained that a w-bit data word (e.g., where w is a positive integer such as 8-bits) is to be used in a system supporting only y-bit data word access (e.g., where y is a positive integer such as 16-bits) 2402. In one example, w may be a fraction (e.g., ¼, ⅓, ½, ¾, etc.) of y or less than y. Data may then be encapsulated within the lowest n−1 bits of an n-bit number, where n is a positive integer and n−1 is equal to or greater than y 2404. For instance, n=20 bits and n−1=19 bits are used to encapsulate data (e.g., a 16-bit data word plus other information). In other instances, in a system or a protocol that does not implement/require error detection or control information, the whole n−1 bits (19-bits in 12-digit ternary) can be data.

In one example, illustrated in FIG. 15, the n−1 bits may represent a numerical space that can be completely represented within a k-digit odd numerical base number space, but the full n-bit number space can only be partially represented within the k-digit odd numerical base number space without adding more digits.

A data word-size change indicator may be provided within a most significant bit of the n-bit number while also allocating a w-bit data region for transfer of the w-bit data word 2406. For example, FIG. 18 illustrates a numerical region 1804 that may be used to indicate a byte-size data word access by using a low byte, and another region 1806 that may be used to indicate a byte-size data word access by using a high byte. Other data word-size indicators and/or changes may also be implemented, such as changing to nibble (4-bit) data words.

The n-bit number may then be transcoded (converted) into a k-digit odd numerical base number, where k is a positive integer and the k-digit odd numerical base number defines a first numerical region (e.g., space) that is larger than a second numerical region (e.g., space) defined by an n−1-bit number space, and the n-bit number is limited (e.g., bound, restricted) to an excess/residual numerical region defined as a number space by which the first numerical region exceeds the second numerical region 2408. This excess/residual numerical region may be used to encode additional information. Note that the n-bit number may be restricted to representing numbers within the first numerical region, which may only represent a portion of the numerical region capable of being represented by n bits. When the nth bit is "1", the numerical space represented by the n-bit number may be restricted to the excess/residual numerical region (e.g., the numerical region by which the first numerical region exceeds the second numerical region). In this manner, no additional digits need be added to the k-digit odd numerical base number to represent at least a portion of the most significant bit of the n-bit number.

The k-digit odd numerical base number may then be transcoded into symbols for transmission over a bus 2410 (e.g., a two line bus).

In this manner, the residual numerical space may be used by setting the most significant bit (i.e., "1") of the n-bit number (restricted to only representing numbers within the excess/residual numerical space) without having to add more digits to the k-digit odd numerical base number. In addition to the data word-size change indicator, the residual numerical space may serve to encode additional information, such as an extension protocol, a second/distinct protocol, an overlay protocol.

In one example, the n-bit number is 20 bits long and the k-digit odd numerical base number is a ternary number that is 12 digits long. According to one aspect, the most significant bit of the n-bit number is the $20^{th}$ bit of the n-bit number and defines at least one 256 state region.

According to one aspect, the most significant bit of the n-bit number is the $20^{th}$ bit of the n-bit number and defines two (2) 256 state regions. In another example, the n-bit number includes an I3C high data rate (HDR) binary sequence.

Additionally, the method may further comprise: (a) ascertaining, prior to or concurrent with a read operation, a buffer empty condition for a transmission buffer; and/or (b) transmitting filler data if the buffer empty condition is ascertained, where such filler data is within the n-bit number.

Moreover, the method may further comprise: (a) ascertaining an over threshold condition for a transmission buffer; and/or (b) setting at least one bit of the n-bit number as an over threshold indicator to indicate the over threshold condition for the transmission buffer. In one example, the over threshold indicator reuses control bits encoded in n-bit number.

In one example, the method may further include: (a) writing image data captured by an image sensor to the transmission buffer, wherein the image data is included in the n-bit number; and/or (b) sending image data from the transmission buffer to a receiving device over the control data bus according to requests from the receiving device.

Figure 25:
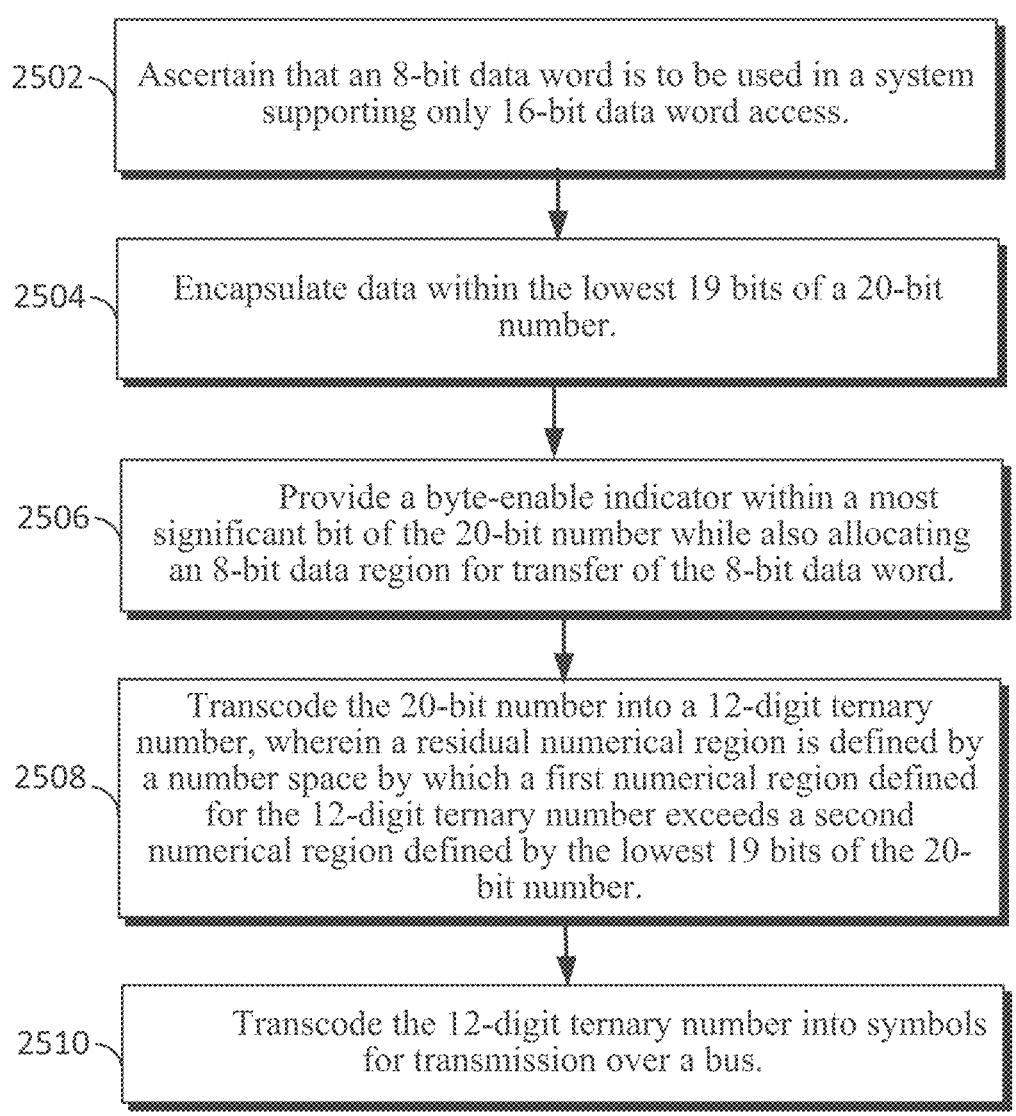
FIG. 25 illustrates an exemplary method to provide 8-bit word access in a system supporting only 16-bit word access.

FIG. 25 illustrates an exemplary method to provide 8-bit word access in a system supporting only 16-bit word access. In a system supporting only 16-bit data word access, it is ascertained that an 8-bit data word is to be used 2502. Because such system expects all word accesses to be in 16-bit data words, there may not be any built-in provisions to indicate 8-bit word accesses instead. Data may be encapsulated or encoded within the lowest 19 bits of a 20-bit number 2504. A byte-enable indicator (e.g., indicating an 8-bit data word access instead of a 16-bit data word access within the particular 20-bit number) is provided within a most significant bit of the 20-bit number while also allocating an 8-bit data region for transfer of the 8-bit data word 2506.

The 20-bit number may be transcoded (e.g., converted as illustrated in FIGS. 9-21) into a 12-digit ternary number, wherein a residual numerical region (e.g., bit 19 region 1504 in FIG. 15) is defined by a number space by which a first numerical region defined for the 12-digit ternary number exceeds a second numerical region defined by the lowest 19 bits of the 20-bit number 2508.

The 12-digit ternary number may then be transcoded into symbols (e.g., as illustrated in FIGS. 10 and 11) for transmission over a bus 2510.

Figure 26:
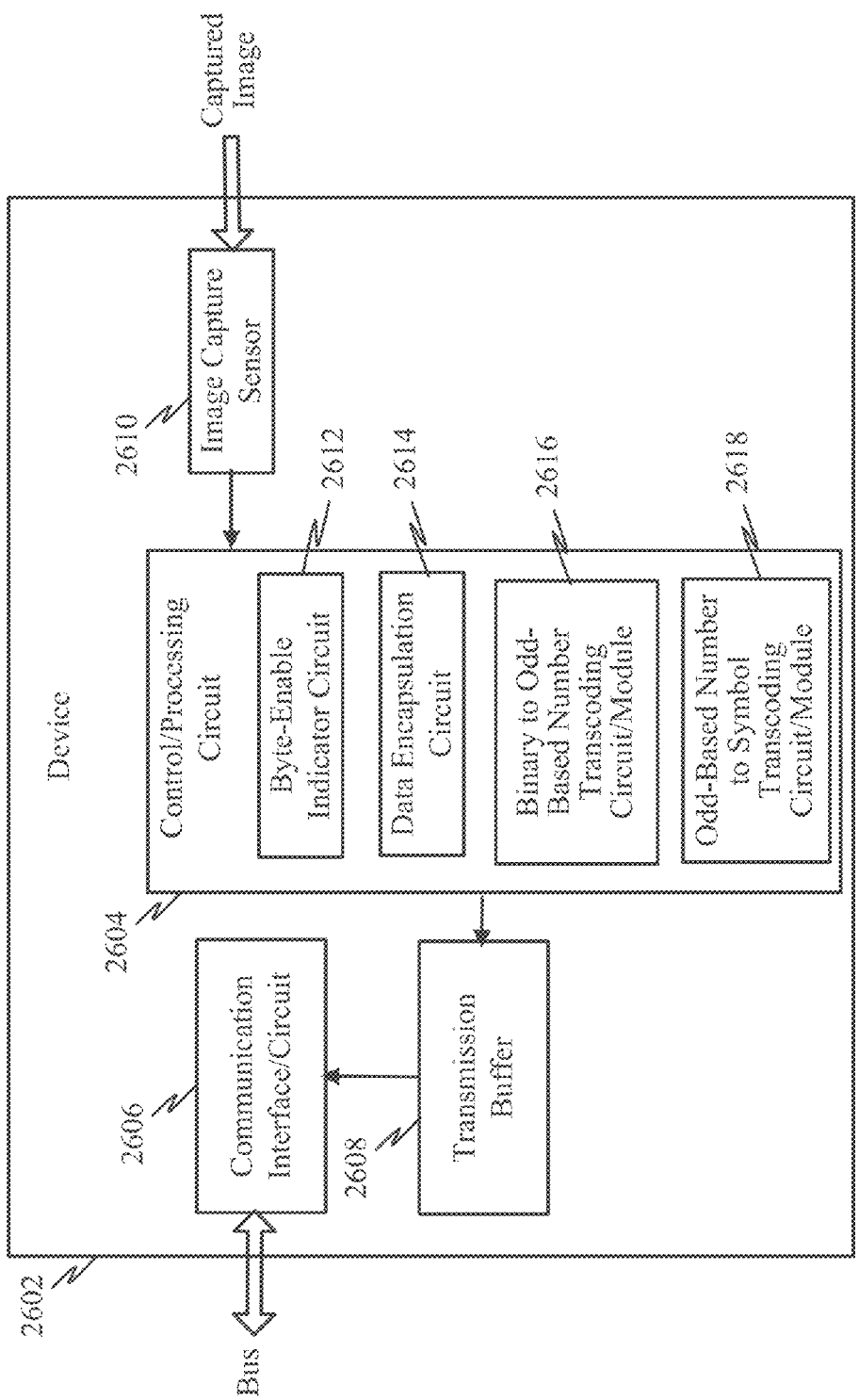
FIG. 26 illustrates an exemplary device adapted to implement the methods of FIGS. 23, 24, and/or 25.

FIG. 26 illustrates an exemplary device adapted to implement the methods of FIGS. 23, 24, and/or 25. In one example, the device 2602 may be an image sensor device adapted to facilitate 8-bit word access in a system supporting only 16-bit word access. The device 2602 may include control circuit 2604, a communication interface 2606, a transmission buffer 2608, and/or an image capture sensor 2610. The image capture sensor 2610 may serve to capture image data. The transmission buffer 2608 may serve to store the captured image data for transmission after encapsulation and/or encoding (e.g., transcoding). The communication interface 2606 may serve to couple to a single-ended control data bus according to requests from a receiving device. The control circuit 2604 configured to perform one or more of the methods/steps illustrated in FIGS. 22, 23, 24, and/or 25.

For instance, a data encapsulation circuit 2614 may be adapted to encapsulate data as illustrated in FIGS. 1-25. A binary to odd-based number transcoding circuit/module 2616 may serve to transcode between binary numbers and odd-based numbers (e.g., ternary, etc.) as illustrated in FIGS. 1-25. An odd-based number to symbol transcoding circuit/module 2618 may serve to transcode between odd-base numbers and symbols as illustrated in FIGS. 1-25. A byte-enable indicator circuit 2612 may serve to provide a byte-enable indicator to facilitate 8-bit word access in a system supporting only 16-bit word access.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, comprising:
ascertaining that a w-bit data word is to be used in a system supporting only y-bit data word access, where w and y are positive integers;
encapsulating data within the lowest n−1 bits of an n-bit number, where n is a positive integer and n−1 is equal to or greater than y;
providing a data word-size change indicator within a most significant bit of the n-bit number while also allocating a w-bit data region for transfer of the w-bit data word; and
transcoding the n-bit number into a k-digit odd numerical base number, where k is a positive integer and the k-digit odd numerical base number defines a first numerical region that is larger than a second numerical region defined by a n−1-bit number space, and the n-bit number is limited to a residual numerical region defined as a number space by which the first numerical region exceeds the second numerical region.

2. The method of claim 1, further comprising:
transcoding the k-digit odd numerical base number into symbols for transmission over a bus.

3. The method of claim 1, wherein the residual numerical region accessed by setting the most significant bit of the n-bit number to one (1).

4. The method of claim 1, wherein the n-bit number is 20 bits long and the k-digit odd numerical base number is a ternary number that is 12 digits long.

5. The method of claim 1, wherein the most significant bit of the n-bit number is the 20th bit of the n-bit number and defines at least one 256 state regions.

6. The method of claim 1, wherein the most significant bit of the n-bit number is the 20th bit of the n-bit number and defines two (2) 256 state regions.

7. The method of claim 1, wherein the lowest n−1 bits of the n-bit number includes an I3C high data rate (HDR) binary sequence.

8. The method of claim 1, further comprising:
ascertaining, prior to or concurrent with a read operation, a buffer empty condition for a transmission buffer; and
transmitting filler data if the buffer empty condition is ascertained, where such filler data is within the n-bit number.

9. The method of claim 1, further comprising:
ascertaining an over threshold condition for a transmission buffer; and
setting at least one bit of the n-bit number as an over threshold indicator to indicate the over threshold condition for the transmission buffer.

10. The method of claim 1, further comprising:
writing image data captured by an image sensor to the transmission buffer, wherein the image data is included in the lowest n−1 bits of the n-bit number; and
sending image data from the transmission buffer to a receiving device over a control data bus according to requests from the receiving device.

11. The method of claim 1, wherein a numerical space capable of being represented by the n-bit number is larger than the first numerical region capable of being defined by the k-digit odd numerical base number.

12. The method of claim 1, wherein in a first mode of operation, the lowest n−1 bits of the n-bit number encapsulate a first protocol, and in a second mode of operation, the n-bit number encapsulates a second protocol.

13. An image sensor device, comprising:
an image sensor to capture image data;
a transmission buffer to store the captured image data;
a communication interface to couple to a single-ended control data bus according to requests from a receiving device;
a control circuit coupled to the image sensor, the transmission buffer, and the communication interface, the control circuit configured to
ascertain that a w-bit data word is to be used in a system supporting only y-bit data word access, where w and y are positive integers;
encapsulate data within the lowest n−1 bits of an n-bit number, where n is a positive integer and n−1 is equal to or greater than y;
provide a data word-size change indicator within a most significant bit of the n-bit number while also allocating a w-bit data region for transfer of the w-bit data word; and
transcode the n-bit number into a k-digit odd numerical base number, where k is a positive integer and the k-digit odd numerical base number defines a first numerical region that is larger than a second numerical region defined by a n−1-bit number space, and the n-bit number is limited to a residual numerical region defined as a number space by which the first numerical region exceeds the second numerical region.

14. The image sensor device of claim 13, wherein the n-bit number is 20 bits long and the k-digit odd numerical base number is a ternary number that is 12 digits long.

15. The image sensor device of claim 13, wherein the most significant bit of the n-bit number is the 20th bit of the n-bit number and defines at least one 256 state regions.

16. The image sensor device of claim 13, wherein the most significant bit of the n-bit number is the 20th bit of the n-bit number and defines two (2) 256 state regions.

17. The image sensor device of claim 13, wherein the control circuit is further configured to:
ascertain a buffer empty condition for the transmission buffer; and
transmit filler data if the buffer empty condition is ascertained.

18. The image sensor device of claim 13, wherein the control circuit is further configured to:
ascertain an over threshold condition for the transmission buffer; and
set at least one bit of the n-bit number as an over threshold indicator to indicate the over threshold condition for the transmission buffer.

19. The image sensor device of claim 13, wherein the control circuit is further configured to:
write image data captured by an image sensor to the transmission buffer, wherein the image data is included in the n-bit number; and
send image data from the transmission buffer to a receiving device over the control data bus according to requests from the receiving device.

20. A method for enabling 8-bit data word access over a protocol limited to 16-bit data word access, comprising:
ascertaining that an 8-bit data word is to be used in a system supporting only 16-bit data word access;
encapsulating data within the lowest 19 bits of a 20-bit number;
providing a byte-enable indicator within a most significant bit of the 20-bit number while also allocating an 8-bit data region for transfer of the 8-bit data word; and
transcoding the 20-bit number into a 12-digit ternary number, wherein a residual numerical region is defined as a number space by which a first numerical region defined for the 12-digit ternary number exceeds a second numerical region defined by the lowest 19 bits of the 20-bit number.

21. The method of claim 20, wherein the 20-bit number is limited the number space within the residual numerical region.

22. The method of claim 20, wherein the most significant bit of the 20-bit number serves to define a number space with at least two (2) 256 state regions.

23. The method of claim 20, wherein the lowest 19 bits of the 20-bit number includes an I3C high data rate (HDR) binary sequence.

24. The method of claim 20, further comprising:
ascertaining, prior to or concurrent with a read operation, a buffer empty condition for a transmission buffer; and
transmitting filler data if the buffer empty condition is ascertained, where such filler data is within the n-bit number.

25. The method of claim 20, further comprising:
ascertaining an over threshold condition for a transmission buffer; and
setting at least one bit of the 20-bit number as an over threshold indicator to indicate the over threshold condition for the transmission buffer.

26. The method of claim 20, further comprising:
writing image data captured by an image sensor to the transmission buffer, wherein the image data is included in the lowest 19 bits of the 20-bit number, and
sending image data from the transmission buffer to a receiving device over a control data bus according to requests from the receiving device.

27. An image sensor device, comprising:
an image sensor to capture image data;
a transmission buffer to store the captured image data;
a communication interface to couple to a single-ended control data bus according to requests from a receiving device;
a control circuit coupled to the image sensor, the transmission buffer, and the communication interface, the control circuit configured to
ascertain that an 8-bit data word is to be used in a system supporting only 16-bit data word access;
encapsulate data within the lowest 19 bits of a 20-bit number;
provide a byte-enable indicator within a most significant bit of the 20-bit number while also allocating an 8-bit data region for transfer of the 8-bit data word; and
transcode the 20-bit number into a 12-digit ternary number, wherein a residual numerical region is defined as a number space by which a first numerical region defined for the 12-digit ternary number exceeds a second numerical region defined by the lowest 19 bits of the 20-bit number.

28. The image sensor device of claim 27, wherein the 20-bit number is limited the number space within the residual numerical region.

29. The image sensor device of claim 27, wherein the most significant bit of the 20-bit number serves to define a number space with at least two (2) 256 state regions.

30. The image sensor device of claim 27, wherein the lowest 19 bits of the 20-bit number includes an I3C high data rate (HDR) binary sequence.

* * * * *